(12) United States Patent
Lozhkin

(10) Patent No.: US 7,532,690 B2
(45) Date of Patent: May 12, 2009

(54) RECEIVER FOR M-ARY-QAM MIMO COMMUNICATION SYSTEM

(75) Inventor: Alexander Lozhkin, Kawasaki (JP)

(73) Assignee: Fujitsu Limited, Kawasaki (JP)

(\*) Notice: Subject to any disclaimer, the term of this patent is extended or adjusted under 35 U.S.C. 154(b) by 636 days.

(21) Appl. No.: 11/255,527

(22) Filed: Oct. 21, 2005

(65) Prior Publication Data

US 2006/0262886 A1    Nov. 23, 2006

(30) Foreign Application Priority Data

May 20, 2005    (JP)    ............... 2005-147585

(51) Int. Cl.
*H04L 1/02*    (2006.01)
*H04B 7/02*    (2006.01)

(52) U.S. Cl. .................... 375/347; 375/267

(58) Field of Classification Search ............ 375/267, 375/347; 455/132, 272, 500
See application file for complete search history.

(56) References Cited

U.S. PATENT DOCUMENTS

2003/0145269 A1\*    7/2003    Kuo et al. ............ 714/749
2003/0235149 A1\*    12/2003    Chan et al. ........... 370/206

OTHER PUBLICATIONS

A. van Zelst. Space Division Multiplexing Algorithms. Proceedings of IEEE MElecon 2000, Cyprus, vol. 3, May 2000.
Geert Awater, et al. Reduced Complexity Space Division Multiplexing Receivers. Proc. Of IEEE VTC2000, Tokyo, Japan, May 15, 2000.
Alexander N. Lozhkin. Novell Interactive MAP Detector for MIMO Communication. Proceedings of WPMC'04, Abano, Sep. 12, 2004.
D. Gesbert, et al. MIMO Wireless Channels: Capacity and Performance Prediction. IEEE Global Telecommunications Conference, Nov. 27, 2000.
Kenichi Higuchi, et al. Adaptive Selection of Surviving Symbol Replica Candidates Based on Maximum Reliability on QRM-MLD for OFCDM MIMO Multiplexing. IEEE, 2004.
A. van Zelst et al. Space Division Multiplexing (SDM) for OFDM systems. Proceedings IEEE VTC2000, Tokyo, Japan, May 15, 2000.
Yoshihiko Akaiwa. Introduction to Digital Mobile Communication. Wiley-Interscience Publication John Wiley & Sons, Inc. pp. 80-81, 1997.

\* cited by examiner

*Primary Examiner*—Betsy L Deppe
(74) *Attorney, Agent, or Firm*—Katten Muchin Rosenman LLP

(57) ABSTRACT

The received signal $y_0(t)$ is modulated by M-ary-QAM method. The same signal is received by the receiver 0 and receiver 1 through different paths. First, the receiver 0 detects the received signal and calculates a posteriori probabilities for the detected signal. These a posteriori probabilities are sent to the receiver 1. The receiver 1 detects the same signal and calculates second a posteriori probabilities using the probabilities sent from the receiver 0. The second a posteriori probabilities are sent to the receiver 0 and used to calculate third a posteriori probabilities in the receiver 0. These processes are repeated several times. Finally, both a posteriori probabilities of the receiver 0 and 1 are combined to decide the received signals.

5 Claims, 16 Drawing Sheets

FIG. 5

RECEIVER FOR M-ARY-QAM MIMO COMMUNICATION SYSTEM

BACKGROUND OF THE INVENTION

1. Field of the Invention

The present invention relates to communication system employing MIMO technique with two or more antennas at the transmitting and the receiving ends.

2. Description of the Related Arts

Digital communication using multiple-input-multiple-output (MIMO), sometimes called a "volume-to-volume", wireless link has recently emerged as one of the most significant breakthroughs in modern communications. A key feature of MIMO system is the ability to turn multipath propagation, traditionally a pitfall of wireless transmission, into a benefit for user. MIMO technology effectively takes advantage of random fading and, when available, multipath delay which ceases effectiveness of multiplying data transfer rates.

It is a common practice for MIMO-based communication system that for the data stream of interest, the contributions from other data streams are removed by signal processing by subtracting signal replica of the other data streams from the data stream of interest, i.e. compensation technique is employed (V-BLAST, MSSE-VBLAST, Zero Forced V_BLAST).

MIMO system can be defined simply as below. Given an arbitrary wireless communication system, we consider a link for which the transmitting end as well as the receiving end is equipped with multiple antenna elements. Such set up for the case when only two antennas are employed at the transmitting and the receiving sides is illustrated in FIG. 1. According to FIG. 1, there are two transmitters each having one antenna. From each transmitter, a different data stream is transmitted. The transmitter TRX0 receives 1st data stream having data $D_0$ and transmits it. The transmitter TRX1 receives the 2nd data stream having data $D_1$ and transmits it. Each data $D_0$, $D_1$ propagates in the air and is received by two receiver REC0, REC1. Each receiver REC0, REC1 has one antenna respectively. The received signal $y_0$ of the receiver REC0 includes the transmitted signals of signal $D_0$, $D_1$. Also, the received signal $y_1$ of the receiver REC1 includes the transmitted signals of signal $D_0$, $D_1$.

At the receiving array, the spatial signature of each of the received signals is estimated. Based on this information, a signal processing technique is then applied to separate the signals. Linear or non-linear receivers can be used in consideration of a range of performance/complexity trade-off.

Signal at the receivers can be expressed as $$y_0 = D_0 \cdot h_{00} + D_1 \cdot h_{01} \quad (1)$$

$$y_1 = D_0 \cdot h_{10} + D_1 \cdot h_{11} \quad (2)$$

or in the form of the vector product

Y=H·D, where $$H = \begin{bmatrix} h_{00} & h_{01} \\ h_{10} & h_{00} \end{bmatrix}, D = \begin{bmatrix} D_0 \\ D_1 \end{bmatrix}, Y = \begin{bmatrix} y_0 \\ y_1 \end{bmatrix}$$

$h_{ij}$ is transfer coefficient from j-th transmitter to the i-th receiver. $D_0$ and $D_1$ are symbols from the first and the second data streams respectively. Each transmitted symbol $D_0$ and $D_1$ is carrying several bits of information. (BPSK 1 bit; QPSK 2 bits; QAM-16 4 bits).

There are several conventional decoding methods as below.

The Zero Forcing Algorithm [See Non-Patent Document 1]

The first conventional decoding technique is so-called Zero-Forcing (ZF) algorithm. With ZF, the estimates of the transmitted vector are obtained at the receiver using the following equation:

$$D\hat{0} = (H^* \cdot H)^{-1} H^* \cdot Y = H^+ \cdot Y \quad (3)$$

where "+" represents the pseudo-inverse. In order for the pseudo-inverse to exist, the number of transmitting antennas must to be less than or equal to the number of receiving antennas.

MMSE Algorithm [See Non-Patent Document 1]

Another approach in linear estimation theory to the problem of estimating a random vector D on the basis of observation Y is to choose a matrix G that minimizes the Mean Square Error (MMSE) given below.

$$\epsilon^2 = E[(D-D\tilde{\,})^*(D-D\tilde{\,})] = [(D-G \cdot Y)^*(D-G \cdot Y)] \quad (4)$$

The solution can be obtained as $$D\hat{0} = (\alpha \cdot I + H^* \cdot H)^{-1} H^* \cdot Y \quad (5)$$

where α is equal to the noise dispersion. From (5) it becomes clear that the ZF approach corresponds to an MSSE solution with α equals to zero.

Decision Feedback Decoding [See Non-Patent Document 1, and 2]

The Zero Forcing approach described before is viable, but superior performance is obtained if non-linear techniques are used. If the most reliable element of the transmitted vector D could be decoded and used to improve decoding of the other elements of D, the performance may increase. This is called symbol cancellation. Furthermore, ZF, or MMSE is used to perform detection process in Decision Feedback Decoding process. In other words, symbol cancellation is based on the subtraction of interference of already detected components of D from received signal vector Y.

Maximum Likelihood Decoding [See Non-Patent Document 1]

The only decoding method that is not based on calculation of matrix inverses is the Maximum Likelihood Decoding (MLD) algorithm. MLD is a method that compares the received signal with all possible transmitted vectors (modified by H) and estimates D according to the Maximum Likelihood principle. This principle can be formalized by the following equation.

In the non-patent document 3, the similar device as the present invention is disclosed by the inventor of the present invention. In this document, the technology which can be applied only to BPSK and QPSK cases is disclosed.

$$D\hat{0} = \arg \min ||Y - H \cdot D|| \quad (6)$$

[non-patent document 1]. A. van Zelst, "Space Division Multiplexed Algorithms"

[non-patent document 2] R. van Nee at al. "Maximum Likelihood Decoding in a Space Division Multiplexing System"

[non-patent document 3] Alexander N. Lozhkin "Novell Interactive MAP Detector For MIMO Communication", Proc. of WPMC '04

For the above described receiving techniques simulations are performed to compare the BER performances. The result of the simulation is shown in FIG. 2. In FIG. 2 the BERs for different approaches are depicted against Eb/No per receiving antenna for an antenna configuration 2 by 2 as shown in FIG. 1. Furthermore, a QAM-16 modulation scheme is used and the data is transmitted without coding.

From FIG. 2 it can be seen that MLD has the best performance. However implementation of MLD requires an exhaustive search through all possible transmitted vectors. Therefore the load of calculation is large. Besides, the performance of the ZF is fairly bad compared to the MLD. The performance of the present invention is also shown in FIG. 2 as "Turbo 3TI" and "Turbo 4TI". The superiority of the present invention is described in the chapter of the embodiment.

SUMMARY OF THE INVENTION

Accordingly, the objects of the present invention are to provide the receiver with simplified configuration, fast processing speed and light load meanwhile keeping almost the same BER performance (BER, Diversity order) as MLD for MIMO-based communication systems.

The receiver of the present invention is a receiver for M-ary-QAM MIMO Communication System comprising at least two receiving units each with at least one antenna, each receiving unit comprising: a posteriori probability calculation unit for calculating a posteriori probabilities for signals which are detected by the at least, one antenna and are modulated such that an amplitude of the signals is changed according to signal values, based on set values; a transmission unit for transmitting the a posteriori probabilities to another receiving unit; a setting unit for setting the a posteriori probabilities transmitted from another receiving unit to the set values; and a decision unit for deciding signal value based on a combination of a posteriori probabilities calculated by own receiving unit and another receiving unit, wherein the transmission of the a posteriori probabilities between at least two receiving units is repeated an empirically determined number of times.

According to the present invention, the simple and fast receiver for MIMO communication system is realized.

BRIEF DESCRIPTION OF THE DRAWINGS

FIG. 5 is constellation points for QAM-16 with Gray Mapping

DESCRIPTION OF THE PREFERRED EMBODIMENTS

Figure 2:
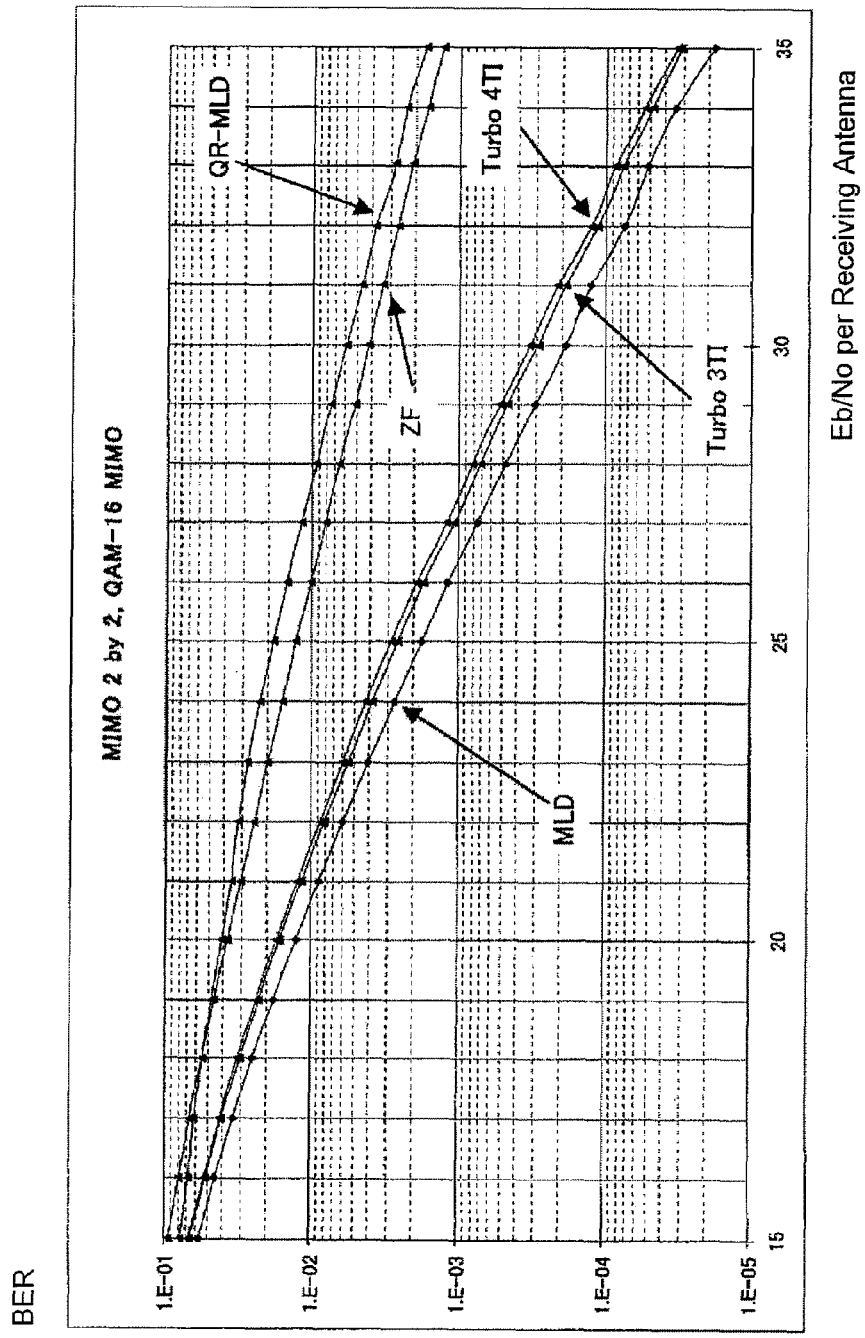
FIG. 2 is BER for different receivers techniques.

Still referring to FIG. 2, the receiver of the present invention provides BER performances that are very close (under 1 dB) to the receiver which employ MLD approach (MLD and QR-MLD in FIG. 2). However in contrast to MLD-based receiver, the complexity of the configuration of the receiver of the present invention is significantly low. The low complexity of the receiver of the present invention is obtained by an interactive estimation technique. Thus instead of comparing the received signal with all possible transmitted vectors (modified by H) for D estimation, in the present invention, data of each data stream are estimated separately and individually, and then the information derived from the one data stream, after non-linear processing, is used to refine the estimated a posteriori probabilities for other data stream, and vice versa.

Such an improvement is obtained by the non-linear signal processing together with turbo algorithm—when information derived from the one data stream, after non-linear processing, is used to refine the estimated a posteriori probabilities for other data stream, and vice versa.

The main advantage of the receiver of the present invention is that, in contrast to the common practice, we implemented iterative maximum likelihood estimation or as we call it Turbo-receiver. This technique provides BER results, which are very close to the Maximum Likelihood Decoding (MLD), and at the same time provides less level of calculation complexity due to implementation.

The receiver of the present invention is based on the interactive maximum a posteriori probabilities estimation algorithm. In the proposed turbo receiver of the present invention, the information derived from the one data stream, after non-linear processing, is used to refine the estimated a posteriori probabilities for other data stream, and vice versa.

Figure 1:
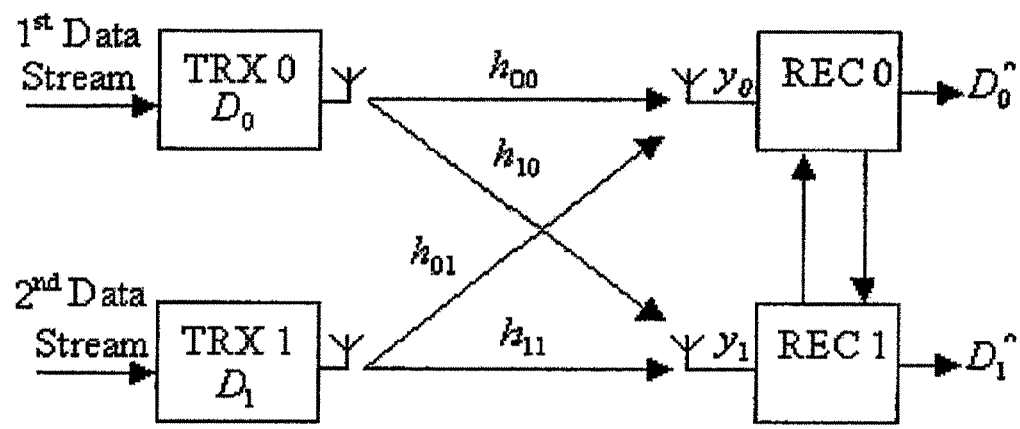
FIG. 1 is the general case of MIMO system with two transmitting and two receiving antennas.

According the present invention in the simple example of MIMO transmission where there are two transmitting and receiving antennas, MIMO communication system comprising: two transmitters with quadrature modulation (i.e. BPSK, QPSK, QAM), which transmit two (the first and the second) data streams independently through two antennas; four complex propagation paths: path from the first transmitting antenna to the first receiving antenna is $h_{00}$; path from the first transmitting antenna to the second receiving antenna is $h_{10}$; path from the second transmitting antenna to the first receiving antenna is $h_{01}$; path from the second transmitting antenna to the second receiving antenna is $h_{11}$; (as shown in FIG. 1)

Preferably, there are two transmitter and two receivers in the MIMO communication system. Each transmitter employs, for example, QAM-16 modulation for transmission of information symbols $D_i$, i=0, 1. In the case of QPSK or M-QAM transmission, each informational symbol $D_i$ consists of several bits i.e $D_i = \{i_{i1}, i_{i2}, q_{i1}, q_{i2}\}$. Thus there are two bits for QPSK constellation—the bit that corresponds to the real part of $D_i$ or $i_1 = \text{Re}(D_i)$ and the bit that corresponds to the imaginary part of $D_i$ or $q_1 = \text{Im}(D_i)$, four bits for QAM-16 (bits $i_1$, $i_2$, $q_1$, $q_2$), eight bits for QAM-64, etc. In the case of BPSK transmissions, imaginary part is not transmitted and is not detected at the receiver and only one bit $i_1$ is transmitted.

Figure 3:
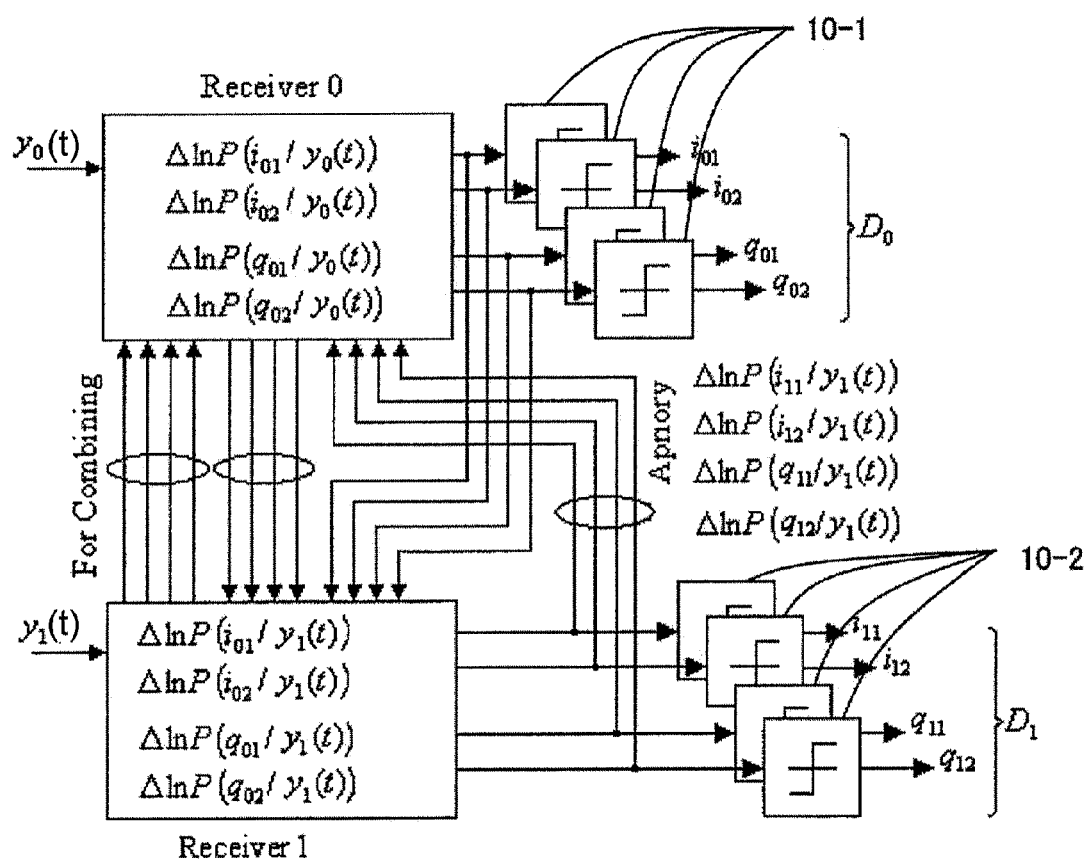
FIG. 3 is the proposed Turbo-receiver for QAM-16 constellation.
Figure 4:
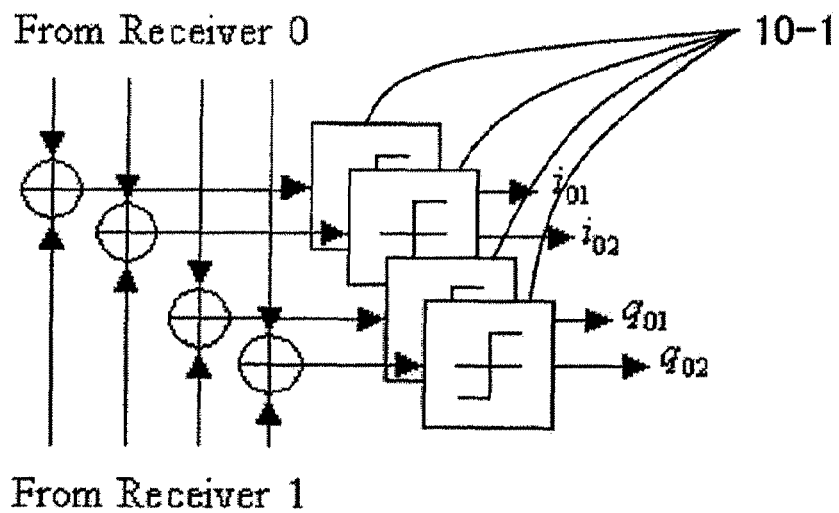
FIG. 4 is the combining scheme that combines the decision obtained at the receiver 0 and receiver 1

FIGS. 3 and 4 show overall configuration of the receiver of the present invention.

For QAM-16 case, the receiver for each information symbol $D_i=\{i_{i1}, i_{i2}, q_{i1}, q_{i2}\}$, i=0, 1, consists of two receiver parts placed in receiver 0 (REC0) and receiver 1 (REC1) (see FIGS. 1 and 3) Each of receivers (REC0 and REC1) provides independent reception for all four bits that correspond to each transmitted information symbol $D_i$, i=0, 1. Estimations for each transmitted symbol or bit are obtained independently in both receivers (REC0 and REC1). Then these independent estimations are combined as shown in FIG. 4 for the case of symbol $D_0$ in order to improve the reliability of decision. The similar combining is assumed for symbol $D_1$.

In Fig. 3, two receivers and the connection between them are shown. The receiver 0 receives the signal $y_0(t)$ and calculates each of probabilities $\Delta \ln P(i_{01}/y_0(t))$, $\Delta \ln P(i_{02}/y_0(t))$, $\Delta \ln P(q_{01}/y_0(t))$, $\Delta \ln P(q_{02}/y_0(t))$. Then these probabilities are transmitted to the receiver 1. The receiver 0 receives from the receiver 1 the probabilities $\Delta \ln P(i_{01}/\Delta_1(t))$, $\Delta \ln P(i_{02}/y_1(t))$, $\Delta \ln P(q_{01}/y_1(t))$, $\Delta \ln P(q_{02}/y_1(t))$ and refines the probabilities $\Delta \ln P(i_{01}/y_0(t))$, $\Delta \ln P(i_{02}/y_0(t))$, $\Delta \ln P(q_{01}/y_0(t))$, $\Delta \ln P(q_{02}/y_0(t))$. After three or four times repetition of this refinement each of the probabilities are sent to the decision units 10-1 and each data value for $i_{01}, i_{02}, q_{01}, q_{02}$ is determined. The same process is conducted for the receiver 1. The receiver 1 receives the signal $\Delta_1(t)$, calculates the probabilities $\Delta \ln P(i_{11}/\Delta_1(t))$, $\Delta \ln P(i_{12}/y_1(t))$, $\Delta \ln P(q_{11}/\Delta_1(t))$, $\Delta \ln P(q_{12}/y_1(t))$ and refines these probabilities by the probabilities $\Delta \ln P(i_{11}/y_0(t))$, $\Delta \ln P(i_{12}/y_0(t))$, $\Delta \ln P(q_{11}/y_0(t))$, $\Delta \ln P(q_{12}/y_0(t))$ received from the receiver 0. And each value for $i_{11}, i_{12}, q_{11}, q_{12}$ is determined by the decision units 10-2. The number of times of repetition for the probability exchange and refinement should be determined by a person of ordinary skill in the art based on the empirical estimation.

After the prescribed number of repetition, the probabilities of the receiver 0 and the probabilities of the receiver 1 are combined as shown in FIG. 4 and sent to the decision units 10-1.

From here, in order to simplify the future discussions without any loss of generality, we assumed that TRX and REC ends employ only two antennas (FIG. 1) and constellation types employed in both transmitters are QAM-16. However all discussions, conclusions and results in this document are correct for any arbitrary number of TRX and REC antennas and type of constellations i.e. M-ary-QAM.

Figure 5:
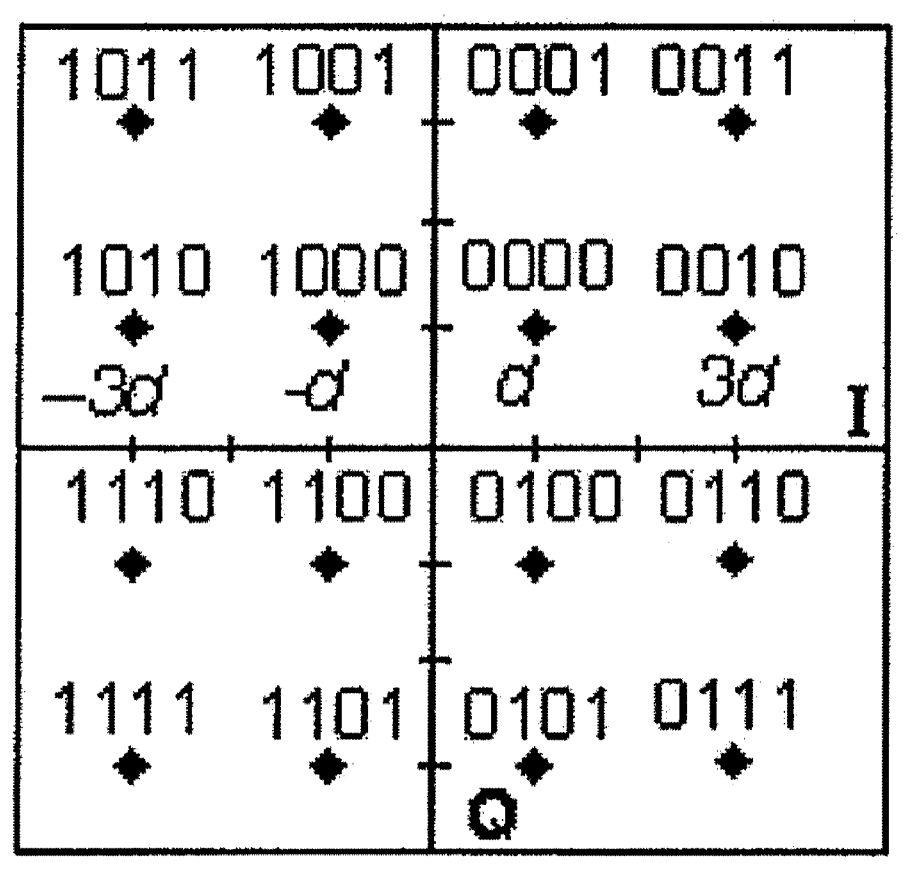

QAM-16 constellation points in the case of Gray mapping are shown in FIG. 5. The quaternary quadrature components Q and I are Gray encoded by assigning the bits 01, 00, 10 and 11 to the levels 3d, d, −d and −3d, respectively. Here we assume the following bits order: $i_1, i_2, q_1, q_2$.

With the above definitions, signals in the quadratures Q and I can be defined by Table 1.

Bits $i_1, i_2, q_1, q_2$ in the 4-bits QAM-16 symbol are suppose to be statistically independent and equiprobable. Because of the statistical independences of the bits $i_1, i_2, q_1, q_2$, signals (see Table 1) in the quadratures are also independent.

There are two transmitter and two receivers in the MIMO communication system shown in FIG. 1. Each transmitter employs QAM-16 modulation (constellation) for transmission of information symbol $D_i$, i=0, 1. Thus each information symbol $D_i$ consists of two parts—the real part $Re(D_i=i_{i1}, i_{i2})$ and the imaginary part $Im(D_i=q_{i1}, q_{i2})$ Information symbol $D_i$ can be transmitted by one of sixteen possible signals $S^*_j(t)$, j=0, ..., 15 from constellation shown in FIG. 5. The specific number of j depends on the four informational data bits $\{i_{i1}, i_{i2}, q_{i1}, q_{i2}\}$ carried by transmitted symbol $D_i=\{i_{i1}, i_{i2}, q_{i1}, q_{i2}\}$ as shown in the table 1 below.

TABLE 1

| Signal No | $i_1$ | $i_2$ | $q_1$ | $q_2$ | Signal $S^*_j(t)$ Re + Im |
|---|---|---|---|---|---|
| $S^*_0(t)$ | 1 | 1 | 1 | 1 | −3d − 3d |
| $S^*_1(t)$ | 1 | 1 | 1 | 0 | −3d − 1d |
| $S^*_2(t)$ | 1 | 1 | 0 | 1 | −3d + 3d |
| $S^*_3(t)$ | 1 | 1 | 0 | 0 | −3d + 1d |
| $S^*_4(t)$ | 1 | 0 | 1 | 1 | −1d − 3d |
| $S^*_5(t)$ | 1 | 0 | 1 | 0 | −1d − 1d |
| $S^*_6(t)$ | 1 | 0 | 0 | 1 | −1d + 3d |
| $S^*_7(t)$ | 1 | 0 | 0 | 0 | −1d + 1d |
| $S^*_8(t)$ | 0 | 1 | 1 | 1 | +3d − 3d |
| $S^*_9(t)$ | 0 | 1 | 1 | 0 | +3d − 1d |
| $S^*_{10}(t)$ | 0 | 1 | 0 | 1 | +3d + 3d |
| $S^*_{11}(t)$ | 0 | 1 | 0 | 0 | +3d + 1d |
| $S^*_{12}(t)$ | 0 | 0 | 1 | 1 | +1d − 3d |
| $S^*_{13}(t)$ | 0 | 0 | 1 | 0 | +1d − 1d |
| $S^*_{14}(t)$ | 0 | 0 | 0 | 1 | +1d + 3d |
| $S^*_{15}(t)$ | 0 | 0 | 0 | 0 | +1d + 1d |

Note that between signals $S^*_j(t)$ there is relation $S^*_0(t)=-S^*_{10}(t)$, $S^*_1(t)=-S^*_{11}(t)$, etc.

Assuming QAM-16 transmissions, signals $y_0(t)$ and $y_1(t)$ at the inputs of the first and the second receivers (receiver number zero (REC0) and receiver number one (REC1)) represent a linear combination of signals transmitted by the first and the second transmitters as $$y_0(t)=h_{00} \cdot D_0 + h_{01} \cdot D_1$$

$$y_1(t)=h_{10} \cdot D_0 + h_{11} \cdot D_1$$

Let's introduce a new notation for transmitted signals $S^*_{ij}(t)$. In this notation index i is the transmitter number (0 or 1) meanwhile index j defines by transmitted information symbol in transmitter number i. Thus j=0, ..., 15 according table 1.

Thus, at the input of the each receiver, there is 256 possible signals defined by the-pair of transmitted informational symbols $D_i=\{i_{i1}, i_{i2}, q_{i1}, q_{i2}\}$ in the first and the second transmitters. Table 2 represents all possible signals $S_j(t)$, i=0, ..., 255 at the REC0 input. The similar results can be obtained for REC1, with replacement of $h_{00} \rightarrow h_{10}$ and $h_{01} \rightarrow h_{11}$.

TABLE 2

| REC0 | | | | | | |
|---|---|---|---|---|---|---|
| $S_j(t)$ | $D_0$ | $D_1$ | $S_j(t)$ | | $D_0$ | $D_1$ |
| $S_0 = h_{00}S^*_{00} + h_{01}S^*_{10}$ | +1 +1 +1 +1 | +1 +1 +1 +1 | $S_8 = h_{00}S^*_{00} + h_{01}S^*_{18}$ | | +1 +1 +1 +1 | −1 +1 +1 +1 |
| $S_1 = h_{00}S^*_{00} + h_{01}S^*_{11}$ | +1 +1 +1 +1 | +1 +1 +1 −1 | $S_9 = h_{00}S^*_{00} + h_{01}S^*_{19}$ | | +1 +1 +1 +1 | −1 +1 +1 −1 |
| $S_2 = h_{00}S^*_{00} + h_{01}S^*_{12}$ | +1 +1 +1 +1 | +1 +1 −1 +1 | $S_{10} = h_{00}S^*_{00} + h_{01}S^*_{110}$ | | +1 +1 +1 +1 | −1 +1 −1 +1 |
| $S_3 = h_{00}S^*_{00} + h_{01}S^*_{13}$ | +1 +1 +1 +1 | +1 +1 −1 −1 | $S_{11} = h_{00}S^*_{00} + h_{01}S^*_{111}$ | | +1 +1 +1 +1 | −1 +1 −1 −1 |
| $S_4 = h_{00}S^*_{00} + h_{01}S^*_{14}$ | +1 +1 +1 +1 | +1 −1 +1 +1 | $S_{12} = h_{00}S^*_{00} + h_{01}S^*_{112}$ | | +1 +1 +1 +1 | −1 −1 +1 +1 |
| $S_5 = h_{00}S^*_{00} + h_{01}S^*_{15}$ | +1 +1 +1 +1 | +1 −1 +1 −1 | $S_{13} = h_{00}S^*_{00} + h_{01}S^*_{113}$ | | +1 +1 +1 +1 | −1 −1 +1 −1 |
| $S_6 = h_{00}S^*_{00} + h_{01}S^*_{16}$ | +1 +1 +1 +1 | +1 −1 −1 +1 | $S_{14} = h_{00}S^*_{00} + h_{01}S^*_{114}$ | | +1 +1 +1 +1 | −1 −1 −1 +1 |
| $S_7 = h_{00}S^*_{00} + h_{01}S^*_{17}$ | +1 +1 +1 +1 | +1 −1 −1 −1 | $S_{15} = h_{00}S^*_{00} + h_{01}S^*_{115}$ | | +1 +1 +1 +1 | −1 −1 −1 −1 |

TABLE 2-continued

| | REC0 | | | | |
|---|---|---|---|---|---|
| $S_j(t)$ | $D_0$ | $D_1$ | $S_j(t)$ | $D_0$ | $D_1$ |
| ... | ... | ... | ... | ... | ... |
| $S_{240} = h_{00}S^*_{015} + h_{01}S^*_{10}$ | $-1-1-1-1$ | $+1+1+1+1$ | $S_{248} = h_{00}S^*_{015} + h_{01}S^*_{18}$ | $-1-1-1-1$ | $-1+1+1+1$ |
| $S_{241} = h_{00}S^*_{015} + h_{01}S^*_{11}$ | $-1-1-1-1$ | $+1+1+1-1$ | $S_{249} = h_{00}S^*_{015} + h_{01}S^*_{19}$ | $-1-1-1-1$ | $-1+1+1-1$ |
| $S_{242} = h_{00}S^*_{015} + h_{01}S^*_{12}$ | $-1-1-1-1$ | $+1+1-1+1$ | $S_{250} = h_{00}S^*_{015} + h_{01}S^*_{110}$ | $-1-1-1-1$ | $-1+1-1+1$ |
| $S_{243} = h_{00}S^*_{015} + h_{01}S^*_{13}$ | $-1-1-1-1$ | $+1+1-1-1$ | $S_{251} = h_{00}S^*_{015} + h_{01}S^*_{111}$ | $-1-1-1-1$ | $-1+1-1-1$ |
| $S_{244} = h_{00}S^*_{015} + h_{01}S^*_{14}$ | $-1-1-1-1$ | $+1-1+1+1$ | $S_{252} = h_{00}S^*_{015} + h_{01}S^*_{112}$ | $-1-1-1-1$ | $-1-1+1+1$ |
| $S_{245} = h_{00}S^*_{015} + h_{01}S^*_{15}$ | $-1-1-1-1$ | $+1-1+1-1$ | $S_{253} = h_{00}S^*_{015} + h_{01}S^*_{113}$ | $-1-1-1-1$ | $-1-1+1-1$ |
| $S_{246} = h_{00}S^*_{015} + h_{01}S^*_{16}$ | $-1-1-1-1$ | $+1-1-1+1$ | $S_{254} = h_{00}S^*_{015} + h_{01}S^*_{114}$ | $-1-1-1-1$ | $-1-1-1+1$ |
| $S_{247} = h_{00}S^*_{015} + h_{01}S^*_{17}$ | $-1-1-1-1$ | $+1-1-1-1$ | $S_{255} = h_{00}S^*_{015} + h_{01}S^*_{115}$ | $-1-1-1-1$ | $-1-1-1-1$ |

In order to simplify further discussions, let's consider only first receiver (REC0). All conclusions and expression below obtained for REC0 can be directly applicable to the second receiver (REC1). To do this, we have to replace $h_{00}$, $h_{10}$ with $h_{10}$, $h_{11}$ and change indexes with signals from 0 to 1, correspondingly.

Calculation on the Bit $i_{01}$ in the Receiver REC 0

The a posteriori probability of the reception of the certain signal $S_i(t)$ from Tables 2 in the additive mixture signal and noise $y_0(t)$ at the first receiver (REC0) input can be described by Bayes' mixed rule:(see Yoshihiko Akaiwa, "Introduction to Digital Mobile Communication" A Wiley-Interscience, p. 81, 1997, ISBN:0471175455)

$$P_i[i_{01}/y_0(t)] = P_i[S_i/y_0(t)] \quad (7)$$
$$= \frac{P_a(S_i)P(y_0(t)/S_i)}{P(y_0(t))}$$
$$\equiv k_0 P_a(S_i) \cdot \exp\left\{-\frac{1}{N_0}\int_0^T [y_0(t) - S_i]^2 dt\right\}$$

From tables 2 we can write that the probability of receiving bit $i_1 = +1$ in the first receiver (REC0) can be expressed as $$P(i_{01} = +1) = \sum_{n=0}^{127} P_a(S_n) \cdot P(S_n/y_0(t)) \quad (8)$$

For all $S_n \in D_0 = \{i_1 = +1, x, x, x\}$ $$P(i_{01} = -1) = \sum_{n=0}^{127} P_a(S_n) \cdot P(S_n/y_0(t)) \quad (9)$$

For all $S_n \in D_0 = \{i_1 = -1, x, x, x\}$

In equations (7-9) $x=\pm 1$, $P_a(S_i)$ is a priori probability receiving/transmitting signal $S_i(t)$ meanwhile $P(S_i/y_0(t))$ is the probability of the receiving signal $S_i(t)$ in the input additive mixture signal $y_0(t)$. A priori probabilities of the received or transmitted signal $S_i(t)$ can be also expressed from table 2 through probabilities of the transmitted symbols $D_0$ and $D_1$ at the first and the second transmitters, $P_0(D_0)$ and $P_1(D_1)$, respectively:

$$P_a(S_0) = P_0(+1+1+1+1)P_1(+1+1+1+1) \quad P_a(S_8) = P_0(+1+1+1+1)P_1(-1+1+1+1)$$

$$P_a(S_1) = P_0(+1+1+1+1)P_1(+1+1+1-1) \quad P_a(S_9) = P_0(+1+1+1+1)P_1(-1+1+1-1)$$

$$P_a(S_2) = P_0(+1+1+1+1)P_1(+1+1-1+1) \quad P_a(S_{10}) = P_0(+1+1+1+1)P_1(-1+1-1+1)$$

$$P_a(S_3) = P_0(+1+1+1+1)P_1(+1+1-1-1) \quad P_a(S_{11}) = P_0(+1+1+1+1)P_1(-1+1-1-1)$$

$$P_a(S_4) = P_0(+1+1+1+1)P_1(+1-1+1+1) \quad P_a(S_{12}) = P_0(+1+1+1+1)P_1(-1-1+1+1)$$

$$P_a(S_5) = P_0(+1+1+1+1)P_1(+1-1+1-1) \quad P_a(S_{13}) = P_0(+1+1+1+1)P_1(-1-1+1-1)$$

$$P_a(S_6) = P_0(+1+1+1+1)P_1(+1-1-1+1) \quad P_a(S_{14}) = P_0(+1+1+1+1)P_1(-1-1-1+1)$$

$$P_a(S_7) = P_0(+1+1+1+1)P_1(+1-1-1-1) \quad P_a(S_{15}) = P_0(+1+1+1+1)P_1(-1-1-1-1)$$

$$\ldots \quad \ldots$$

$$P_a(S_{240}) = P_0(-1-1-1-1)P_1(+1+1+1+1) \quad P_a(S_{248}) = P_0(-1-1-1-1)P_1(-1+1+1+1)$$

$$P_a(S_{241}) = P_0(-1-1-1-1)P_1(+1+1+1-1) \quad P_a(S_{249}) = P_0(-1-1-1-1)P_1(-1+1+1-1)$$

$$P_a(S_{242}) = P_0(-1-1-1-1)P_1(+1+1-1+1) \quad P_a(S_{250}) = P_0(-1-1-1-1)P_1(-1+1-1+1)$$

$$P_a(S_{243}) = P_0(-1-1-1-1)P_1(+1+1-1-1) \quad P_a(S_{251}) = P_0(-1-1-1-1)P_1(-1+1-1-1)$$

$$P_a(S_{244}) = P_0(-1-1-1-1)P_1(+1-1+1+1) \quad P_a(S_{252}) = P_0(-1-1-1-1)P_1(-1-1+1+1)$$

-continued $$P_a(S_{245}) = P_0(-1-1-1-1)P_1(+1-1+1-1) \quad P_a(S_{253}) = P_0(-1-1-1-1)P_1(-1-1+1-1)$$

$$P_a(S_{246}) = P_0(-1-1-1-1)P_1(+1-1-1+1) \quad P_a(S_{254}) = P_0(-1-1-1-1)P_1(-1-1-1+1)$$

$$P_a(S_{247}) = P_0(-1-1-1-1)P_1(+1-1-1-1) \quad P_a(S_{255}) = P_0(-1-1-1-1)P_1(-1-1-1-1)$$

Here index at P defines the transmitter number 0 or 1. With the above definitions we can re-write (8) and (9) as $$\begin{aligned}P(i_{01}=+1) = & P_0(+1+1+1+1)\{P_1(+1+1+1+1)P(S_0)+P_1(+\\&1+1+1-1)P(S_1)+\ldots\}+P_0(+1+1+1-1)\{P_1(+1+1+\\&1+1)P(S_{16})+P(+1+1+1-1)P(S_{17})+\ldots\}+P_0(+1+\\&1-1+1)\{P_1(+1+1+1+1)P(S_{32})+P(+1+1+1-1)P\\&(S_{33})+\ldots\}+\ldots P_0(+1-1-1-1)\{P_1(+1+1+1+1)P\\&(S_{112})+P(+1+1+1-1)P(S_{113})+\ldots\}\end{aligned} \quad (10)$$

$$\begin{aligned}P(i_{01}=-1)= & P_0(-1+1+1+1)\{P_1(+1+1+1+1)P(S_{128})+P_1\\&(+1+1+1-1)P(S_{129})+\ldots\}+P_0(-1+1+1-1)\{P_1(+\\&1+1+1+1)P(S_{144})+P(+1+1+1-1)P(S_{145})+\ldots\}\\&+P_0(-1+1-1+1)\{P_1(+1+1+1+1)P(S_{160})+P(+1+1+\\&1-1)P(S_{161})+\ldots\}+\ldots P_0(-1-1-1-1)\{P_1(+1+\\&1+1+1)P(S_{240})+P(+1+1+1-1)P(S_{241})+\ldots\}\end{aligned} \quad (11)$$

Note, that because all bits are assumed to be independent and equally probable, we can write that $$P_i(i_1, i_2, q_1, q_2) = P_i(i_1) \cdot P_i(i_2) \cdot P_i(q_1) \cdot P_i(q_2) \quad (12)$$

For example:

$$P_1(i_1=1, i_2=+1, q_1=+1, q_2=-1) = P_1(i_1=+1) \cdot P_1(i_2=+1) \cdot P_1(q_1=+1) \cdot P_1(q_2=-1)$$

In order to simplify notation let's introduce a new variable $A_n$ defined as:

$$A_n = \left\{ \begin{array}{l} P(q_{11}=+1)(P(q_{13}=+1)P(S_{4n})+P(q_{13}=-1)P(S_{4n+1}))+ \\ P(q_{11}=-1)(P(q_{13}=+1)P(S_{4n+2})+P(q_{13}=-1)P(S_{4n+3})) \end{array} \right\} \quad (13)$$

Thus, with a new notation:

$$A_0 = \left\{ \begin{array}{l} P(q_{11}=+1)(P(q_{13}=+1)P(S_0)+P(q_{13}=-1)P(S_1))+ \\ P(q_{11}=-1)(P(q_{13}=+1)P(S_2)+P(q_{13}=-1)P(S_3)) \end{array} \right\}$$

$$A_1 = \left\{ \begin{array}{l} P(q_{11}=+1)(P(q_{13}=+1)P(S_4)+P(q_{13}=-1)P(S_5))+ \\ P(q_{11}=-1)(P(q_{13}=+1)P(S_6)+P(q_{13}=-1)P(S_7)) \end{array} \right\}$$

...

$$A_{31} = \left\{ \begin{array}{l} P(q_{11}=+1)(P(q_{13}=+1)P(S_{124})+P(q_{13}=-1)P(S_{125}))+ \\ P(q_{11}=-1)(P(q_{13}=+1)P(S_{126})+P(q_{13}=-1)P(S_{127})) \end{array} \right\}$$

...

$$A_{63} = \left\{ \begin{array}{l} P(q_{11}=+1)(P(q_{13}=+1)P(S_{252})+P(q_{13}=-1)P(S_{253}))+ \\ P(q_{11}=-1)(P(q_{13}=+1)P(S_{254})+P(q_{13}=-1)P(S_{255})) \end{array} \right\}$$

In the new notation equations (10) and (11) together with (12) and (13) are $$P(i_{01}=+1/y_0(t)) = P_a(i_{01}=+1) \left( \begin{array}{l} P(i_{02}=+1) \left( \begin{array}{l} P(q_{01}=+1) \left( \begin{array}{l} P(q_{02}=+1) \left( \begin{array}{l} P(i_{11}=+1)(P(i_{12}=+1)A_0+P(i_{12}=-1)A_1)+ \\ P(i_{11}=-1)(P(i_{12}=+1)A_2+P(i_{12}=-1)A_3) \end{array} \right) + \\ P(q_{02}=-1) \left( \begin{array}{l} P(i_{11}=+1)(P(i_{12}=+1)A_4+P(i_{12}=-1)A_5)+ \\ P(i_{11}=-1)(P(i_{12}=+1)A_6+P(i_{12}=-1)A_7) \end{array} \right) \end{array} \right) \\ P(q_{01}=-1) \left( \begin{array}{l} P(q_{02}=+1) \left( \begin{array}{l} P(i_{11}=+1)(P(i_{12}=+1)A_8+P(i_{12}=-1)A_9)+ \\ P(i_{11}=-1)(P(i_{12}=+1)A_{10}+P(i_{12}=-1)A_{11}) \end{array} \right) + \\ P(q_{02}=-1) \left( \begin{array}{l} P(i_{11}=+1)(P(i_{12}=+1)A_{12}+P(i_{12}=-1)A_{13})+ \\ P(i_{11}=-1)(P(i_{12}=+1)A_{14}+P(i_{12}=-1)A_{15}) \end{array} \right) \end{array} \right) \end{array} \right) + \\ P(i_{02}=-1) \left( \begin{array}{l} P(q_{01}=+1) \left( \begin{array}{l} P(q_{02}=+1) \left( \begin{array}{l} P(i_{11}=+1)(P(i_{12}=+1)A_{16}+P(i_{12}=-1)A_{17})+ \\ P(i_{11}=-1)(P(i_{12}=+1)A_{18}+P(i_{12}=-1)A_{19}) \end{array} \right) + \\ P(q_{02}=-1) \left( \begin{array}{l} P(i_{11}=+1)(P(i_{12}=+1)A_{20}+P(i_{12}=-1)A_{21})+ \\ P(i_{11}=-1)(P(i_{12}=+1)A_{22}+P(i_{12}=-1)A_{23}) \end{array} \right) \end{array} \right) \\ P(q_{01}=-1) \left( \begin{array}{l} P(q_{02}=+1) \left( \begin{array}{l} P(i_{11}=+1)(P(i_{12}=+1)A_{24}+P(i_{12}=-1)A_{25})+ \\ P(i_{11}=-1)(P(i_{12}=+1)A_{26}+P(i_{12}=-1)A_{27}) \end{array} \right) + \\ P(q_{02}=-1) \left( \begin{array}{l} P(i_{11}=+1)(P(i_{12}=+1)A_{28}+P(i_{12}=-1)A_{29})+ \\ P(i_{11}=-1)(P(i_{12}=+1)A_{30}+P(i_{12}=-1)A_{31}) \end{array} \right) \end{array} \right) \end{array} \right) \end{array} \right)$$

-continued $$P(i_{01} = -1/y_0(t)) = P_a(i_{01} = -1) \left( \begin{array}{c} P(i_{02} = +1) \left( \begin{array}{c} P(q_{01} = +1) \left( \begin{array}{c} P(q_{02} = +1) \left( \begin{array}{c} P(i_{11} = +1)(P(i_{12} = +1)A_{32} + P(i_{12} = -1)A_{33}) + \\ P(i_{11} = -1)(P(i_{12} = +1)A_{34} + P(i_{12} = -1)A_{35}) \end{array} \right) + \\ P(q_{02} = -1) \left( \begin{array}{c} P(i_{11} = +1)(P(i_{12} = +1)A_{36} + P(i_{12} = -1)A_{37}) + \\ P(i_{11} = -1)(P(i_{12} = +1)A_{38} + P(i_{12} = -1)A_{39}) \end{array} \right) \end{array} \right) + \\ P(q_{01} = -1) \left( \begin{array}{c} P(q_{02} = +1) \left( \begin{array}{c} P(i_{11} = +1)(P(i_{12} = +1)A_{40} + P(i_{12} = -1)A_{41}) + \\ P(i_{11} = -1)(P(i_{12} = +1)A_{42} + P(i_{12} = -1)A_{43}) \end{array} \right) + \\ P(q_{02} = -1) \left( \begin{array}{c} P(i_{11} = +1)(P(i_{12} = +1)A_{44} + P(i_{12} = -1)A_{45}) + \\ P(i_{11} = -1)(P(i_{12} = +1)A_{46} + P(i_{12} = -1)A_{47}) \end{array} \right) \end{array} \right) \end{array} \right) + \\ P(i_{02} = -1) \left( \begin{array}{c} P(q_{01} = +1) \left( \begin{array}{c} P(q_{02} = +1) \left( \begin{array}{c} P(i_{11} = +1)(P(i_{12} = +1)A_{48} + P(i_{12} = -1)A_{49}) + \\ P(i_{11} = -1)(P(i_{12} = +1)A_{50} + P(i_{12} = -1)A_{51}) \end{array} \right) + \\ P(q_{02} = -1) \left( \begin{array}{c} P(i_{11} = +1)(P(i_{12} = +1)A_{52} + P(i_{12} = -1)A_{53}) + \\ P(i_{11} = -1)(P(i_{12} = +1)A_{54} + P(i_{12} = -1)A_{55}) \end{array} \right) \end{array} \right) + \\ P(q_{01} = -1) \left( \begin{array}{c} P(q_{02} = +1) \left( \begin{array}{c} P(i_{11} = +1)(P(i_{12} = +1)A_{56} + P(i_{12} = -1)A_{57}) + \\ P(i_{11} = -1)(P(i_{12} = +1)A_{58} + P(i_{12} = -1)A_{59}) \end{array} \right) + \\ P(q_{02} = -1) \left( \begin{array}{c} P(i_{11} = +1)(P(i_{12} = +1)A_{60} + P(i_{12} = -1)A_{61}) + \\ P(i_{11} = -1)(P(i_{12} = +1)A_{62} + P(i_{12} = -1)A_{63}) \end{array} \right) \end{array} \right) \end{array} \right) \end{array} \right)$$

For all practical cases it is reasonable to assume that the a priori probabilities $P_a(i_{01}=+1)=P_a(i_{01}=-1)=0.5$. Omitting $P(i,q)$ and taking ln (natural logarithm) leads to:

$$\ln P(i_{01} = +1/y_0(t)) = \ln \left\{ \sum_{n=0}^{31} A_n \right\} \quad (14)$$

$$\ln P(i_{01} = -1/y_0(t)) = \ln \left\{ \sum_{n=32}^{63} A_n \right\} \quad (15)$$

In the maximum-likelihood receiver, the sign that the received information symbol $d_{Re}$ has, is decided according to the result of comparing the a posteriori probabilities or their logarithms with the threshold. Therefore for the $i_{01}$, $$\Delta P(i_{01}/y_0(t)) = \frac{P(i_{01} = +1/y_0(t))}{P(i_{01} = -1/y(t))} >/< 1$$

or its logarithms, $$\Delta \ln P(i_{01}/y_0(t)) = \ln P(i_{01}=+1/y_0(t)) - \ln P(i_{01}=-1/y(t)) >/< 0 \quad (16)$$

where $y_0(t)=S_i(t)+n(t)$ is an additive mixture of a sequence of signals and white Gaussian noise $n(t)$ with the spectral power density $N_0$ and where the symbol $>/<$ indicates comparison with threshold. (This decision procedure is conducted at the final stage of exchange of a posteriori probabilities.) Therefore the decision rule for bit $i_{01}$ with equations (14) and (15) can be expressed as:

$$\Delta \ln P(i_{01}/y_0(t)) = \ln \left\{ \sum_{n=0}^{31} A_n \right\} - \ln \left\{ \sum_{n=32}^{63} A_n \right\} >/< 0 \quad (17)$$

Denote new variables as:

$\Delta 1_n = \ln\{\cosh\{0.5(\ln A_n - \ln A_{n+1})\}\};$ $\Sigma 1_n = (\ln A_n + \ln A_{n+1})$ $\Delta 2_n = \ln\{\cosh\{0.5(0.5(\Sigma 1_n - \Sigma 1_{n+2})) + (\Delta 1_n - \Delta 1_{n+2})\}\}$ $\Sigma 2_n = (\ln A_n + \ln A_{n+1} + \ln A_{n+2} + \ln A_{n+3})$ $\Delta 3_n = \ln\{\cosh\{0.5(0.5(\Sigma 2_n - \Sigma 2_{n+4})) + (\Delta 2_n - \Delta 2_{n+4})\}\}$ $\Sigma 3_n = (\ln A_n + \ln A_{n+1} + \ln A_{n+2} + \ln A_{n+3} + \ln A_{n+4} + \ln A_{n+5} + \ln A_{n+6} + \ln A_{n+7})$ $\Delta 4_n = \ln\{\cosh\{0.5(0.5(\Sigma 3_n - \Sigma 3_{n+4})) + (\Delta 3_n - \Delta 3_{n+4})\}\}$ $$\Sigma 4_n = \begin{pmatrix} \ln A_n + \ln A_{n+1} + \ln A_{n+2} + \ln A_{n+3} + \ln A_{n+4} + \ln A_{n+5} + A_{n+6} + \ln A_{n+7} + \\ \ln A_{n+8} + \ln A_{n+9} + \ln A_{n+10} + \ln A_{n+11} + \ln A_{n+12} + A_{n+13} + \ln A_{n+14} + \ln A_{n+15} \end{pmatrix}$$

With new variables, (14) and (15) can be represented as:

$$\ln P(i_{01} = +1/y_0(t)) = \ln\left\{\sum_{n=0}^{31} A_n\right\} \quad (18)$$

$$= 0.03125\sum_{n=0}^{31} \ln\{A_n\} + 0.0625\sum_{n=0}^{15} \Delta 1_{2n} +$$

$$0.125\sum_{n=0}^{7} \Delta 2_{4n} + 0.25\sum_{n=0}^{3} \Delta 3_{8n} +$$

$$0.5\sum_{n=0}^{1} \Delta 4_{16n} +$$

$$\ln\left\{\cosh\left\{0.5\left(\begin{array}{l} 0.0625(\Delta 4_1 + \Delta 4_{16}) + \\ 0.125\left(\sum_{n=0}^{7}\left(\begin{array}{l}\Delta 1_{2n} - \\ \Delta 1_{2n+16}\end{array}\right)\right) + \\ 0.25\left(\sum_{n=0}^{3}\left(\begin{array}{l}\Delta 2_{4n} - \\ \Delta 2_{4n+16}\end{array}\right)\right) + \\ 0.5\left(\sum_{n=0}^{1}\left(\begin{array}{l}\Delta 3_{8n} - \\ \Delta 3_{8n+16}\end{array}\right)\right) + \\ (\Delta 4_0 - \Delta 4_{16}) \end{array}\right)\right\}\right\}$$

$$\ln P(i_{01} = -1) = \ln\left\{\sum_{n=32}^{63} A_n\right\} \quad (19)$$

$$= 0.03125\sum_{n=32}^{63} \ln\{A_n\} + 0.0625\sum_{n=0}^{15} \Delta 1_{2n+32} +$$

$$0.125\sum_{n=32}^{7} \Delta 2_{4n+32} + 0.25\sum_{n=0}^{3} \Delta 3_{8n+32} +$$

$$0.5\sum_{n=0}^{1} \Delta 4_{16n+32} +$$

$$\ln\left\{\cosh\left\{0.5\left(\begin{array}{l} 0.0625(\Delta 4_{32} + \Delta 4_{48}) + \\ 0.125\left(\sum_{n=0}^{7}\left(\begin{array}{l}\Delta 1_{2n+32} - \\ \Delta 1_{2n+48}\end{array}\right)\right) + \\ 0.25\left(\sum_{n=0}^{3}\left(\begin{array}{l}\Delta 2_{4n+32} - \\ \Delta 2_{4n+48}\end{array}\right)\right) + \\ 0.5\left(\sum_{n=0}^{1}\left(\begin{array}{l}\Delta 3_{8n+32} - \\ \Delta 3_{8n+48}\end{array}\right)\right) + \\ (\Delta 4_{32} - \Delta 4_{48}) \end{array}\right)\right\}\right\}$$

-continued

With (13) (20)

$$\ln\{A_n\} = 0.25(\ln P(S_n) + \ln P(S_{n+1}) + \ln P(S_{n+2}) + \ln P(S_{n+3})) +$$

$$0.50\left(\begin{array}{l}\ln\{\cosh\{0.5(\Delta \ln P(q_{12}) + \ln P(S_n) - \ln P(S_{n+1}))\}\} - \\ \ln\{\cosh\{0.5(\Delta \ln P(q_{12}) + \ln P(S_{n+2}) - \ln P(S_{n+3}))\}\}\end{array}\right) +$$

$$\ln\left\{\cosh\left\{0.5\left(\begin{array}{l}\Delta \ln P(q_{11}) + 0.5[(\ln P(S_n) + \ln P(S_{n+1})) - \\ (\ln P(S_{n+2}) + \ln P(S_{n+3}))] + \\ \ln\{\cosh\{0.5(\Delta \ln P(q_{12}) + \ln P(S_n) - \\ \ln P(S_{n+1}))\}\} - \\ \ln\{\cosh\{0.5(\Delta \ln P(q_{12}) + \ln P(S_{n+2}) - \\ \ln P(S_{n+3}))\}\}\end{array}\right)\right\}\right\}$$

where in $P(S_n) \equiv \ln(P(S_n/y(t)))$ is defined by equation (7).

In the case where decision rules (16) or (17) are implemented, values that are the same for both $P(i_{01}=+1/y_0(t))$ and $P(i_{01}=-1/y_0(t))$ are compensated with each other. Therefore we can write that $$P(S_i) \equiv P[S_i/y_0(t)]$$
$$= P_a(S_i) \cdot \exp\left\{-\frac{1}{N_0}\int_0^T [y_0(t) - S_i]^2 dt\right\}$$

and $$\ln P(S_i) \equiv \ln P_i[S_i/y_0(t)]$$
$$= \left\{-\frac{1}{N_0}\int_0^T [y_0(t) - S_i]^2 dt\right\}$$
$$\equiv -\frac{2}{N_0}\text{Re}\{\overline{y_0(t) \cdot S_i^*}\} + \frac{E_i}{N_0}$$

where the overbar denotes integration, and $E_i$ is the energy of signal $S_i$. Note that $y_0(t)$ and $S^*_i$ are complex variable and *denotes complex conjugation operation.

Summarizing the overall procedure of the embodiment of the present invention, first receiver 0 detects signal, determines the value of the signal, and then calculates equation (16) using a priori probabilities. When calculating equation (16), equations (18)-(20) are used. In equation (20) there are terms like $\Delta \ln P$. At the first time, $\Delta \ln P$ are calculated using a priori probabilities which may be 0.5. After calculating equation (16) for signal bits $i_{01}$, $i_{02}$, $q_{01}$, $q_{02}$, the result is sent to receiver 1. In receiver 1, equation (16) is calculated for signal bits $i_{01}$, $i_{02}$, $q_{01}$, $q_{02}$ inserting the sent result to equation (20). In equation (20), $\Delta \ln P$ like terms appear. These terms are updated to a posteriori ones by the result sent from receiver 0. The calculation result of equation (16) using a posteriori probabilities in receiver 1 is sent back to receiver 0. In receiver 0, equation (16) is calculated using the calculation result sent from receiver 1. These calculations and exchanges are repeated three or four times. Then, using final result of calculation of equation (16), signal decision is conducted. For signal bits $i_{11}$, $i_{12}$, $q_{11}$, $q_{12}$, the above process starts from receiver 1. The receiver 1 calculates equation (16) for $i_{11}$, $i_{12}$, $q_{11}$, $q_{12}$ using a priori probabilities and sends them to receiver 0. The receiver 0 calculates equation (16) for bits $i_{11}$, $i_{12}$, $q_{11}$, $q_{12}$ and sends them back to receiver 1. The receiver 1 calculates equation (16) for signal bits $i_{11}$, $i_{12}$, $q_{11}$, $q_{12}$, using the sent result from receiver 0. These processes are repeated three or four times and finally, signal decision is conducted in receiver 1 using the final result of equation (16).

The a posteriori probabilities for other bits $i_{02}$, $q_{01}$, and $q_{02}$ can be calculated in the similar way according to the following expressions:

Bit $i_{02}$:

Bit $i_{02}$:

$$P(i_{02} = +1) = \sum_{n=0}^{127} P_a(S_n) \cdot P(S_n/y_0(t)) \quad (21)$$

For all $S_n \in D_0 = \{i_2 = x, +1, x, x\}$ $$P(i_{02} = -1) = \sum_{n=0}^{127} P_a(S_n) \cdot P(S_n/y_0(t)) \quad (22)$$

For all $S_n \in D_0 = \{i_2 = x, -1, x, x\}$

Bit $q_{01}$:

$$P(q_{01} = +1) = \sum_{n=0}^{127} P_a(S_n) \cdot P(S_n/y_0(t)) \quad (23)$$

For all $S_n \in D_0 = \{q_1 = x, x, +1, x\}$ $$P(q_{01} = -1) = \sum_{n=0}^{127} P_a(S_n) \cdot P(S_n/y_0(t)) \quad (24)$$

For all $S_n \in D_0 = \{q_1 = x, x, -1x\}$

Bit $q_{02}$:

$$P(q_{02} = +1) = \sum_{n=0}^{127} P_a(S_n) \cdot P(S_n/y_0(t)) \quad (25)$$

For all $S_n \in D_0 = \{q_2 = x, x, x, +1\}$ $$P(q_{02} = -1) = \sum_{n=0}^{127} P_a(S_n) \cdot P(S_n/y_0(t)) \quad (26)$$

For all $S_n \in D_0 = \{q_2 = x, x, x, +1\}$

FIGS. 6 through 16 are block-diagrams of the receiver REC 0 which processes input signal $y_0(t)$ and calculates $\Delta \ln P(i_{01}/y_0(t))$ according to equations (18) and (19).

Note that in FIGS. 6 through 16 "Lin" means Linear and "LN" means Non-linear outputs.

Receiver shown in FIGS. 3 through 16 calculates all a posteriori probabilities for bits transmitted in the symbols $D_0$ and $D_1$. In order to specify algorithm, the following substitutions must be done to get the proper results.

Common for bits $i_{01}$, $i_{02}$, $q_{01}$, $q_{02}$ in REC 0:

$S_0 = Re\{k \cdot y_0(t) \cdot h^*_{01}\}$, $S_1 = Im\{k \cdot y_0(t) \cdot h^*_{01}\}$ $S_2 = Re\{k \cdot y_0(t) \cdot h^*_{01}\}$, $S_3 = Im\{k \cdot y_0(t) \cdot h^*_{00}\}$, $\Delta E_i = k \cdot h_{00} \cdot h^*_{01} \cdot S^*_i$ $Re\Delta E_i = Re(\Delta E_i) = Re(k \cdot h_{00} \cdot h^*_{01} \cdot S^*_u)$, $Im\Delta E_i = Im(\Delta E_i) = Im(k \cdot h_{00} \cdot h^*_{01} \cdot S^*_i)$, where $S^*_i$ is still defined in Table 1.

$A_0 = 8 \uparrow h_{01}|^2$, $A_1 = 8|h_{00}|^2$ are the constants;

A priori apr_q3=$\Delta \ln P(q_{01}/y_0(t))$ is obtained from REC0 i.e. obtained from the adjacent receiver.

A priori apr_q4=$\Delta \ln P(q_{02}/y_0(t))$ is obtained from REC0 i.e. obtained from the adjacent receiver.

A priori apr_i3=$\Delta \ln P(i_{01}/y_0(t))$ is obtained from REC0 i.e. obtained from the adjacent receiver.

A priori apr_i4=$\Delta \ln P(q_{02}/y_0(t))$ is obtained from REC0 i.e. obtained from the adjacent receiver.

Specific for Bits in REC 0:
Bit $i_{01}$:
LUT A, LUT B shown in FIG. 9

Figure 6:
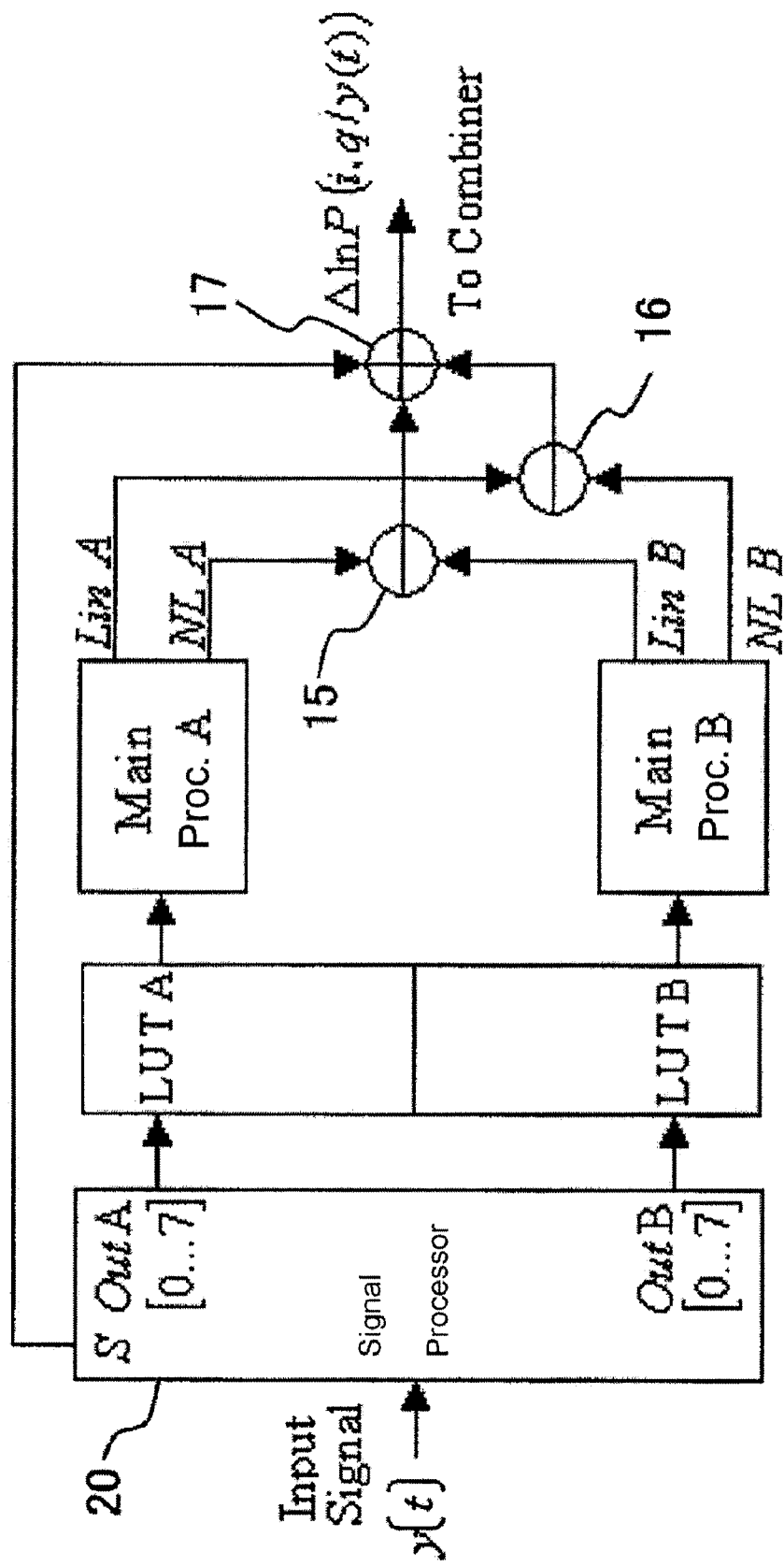
FIG. 6 is the Single Bit Receiver that calculates the differences of a posteriori probabilities for all bits $i_1$, $i_2$, $q_1$, $q_2$ contained in the transmitted information symbol $D_0$.
Figure 13:
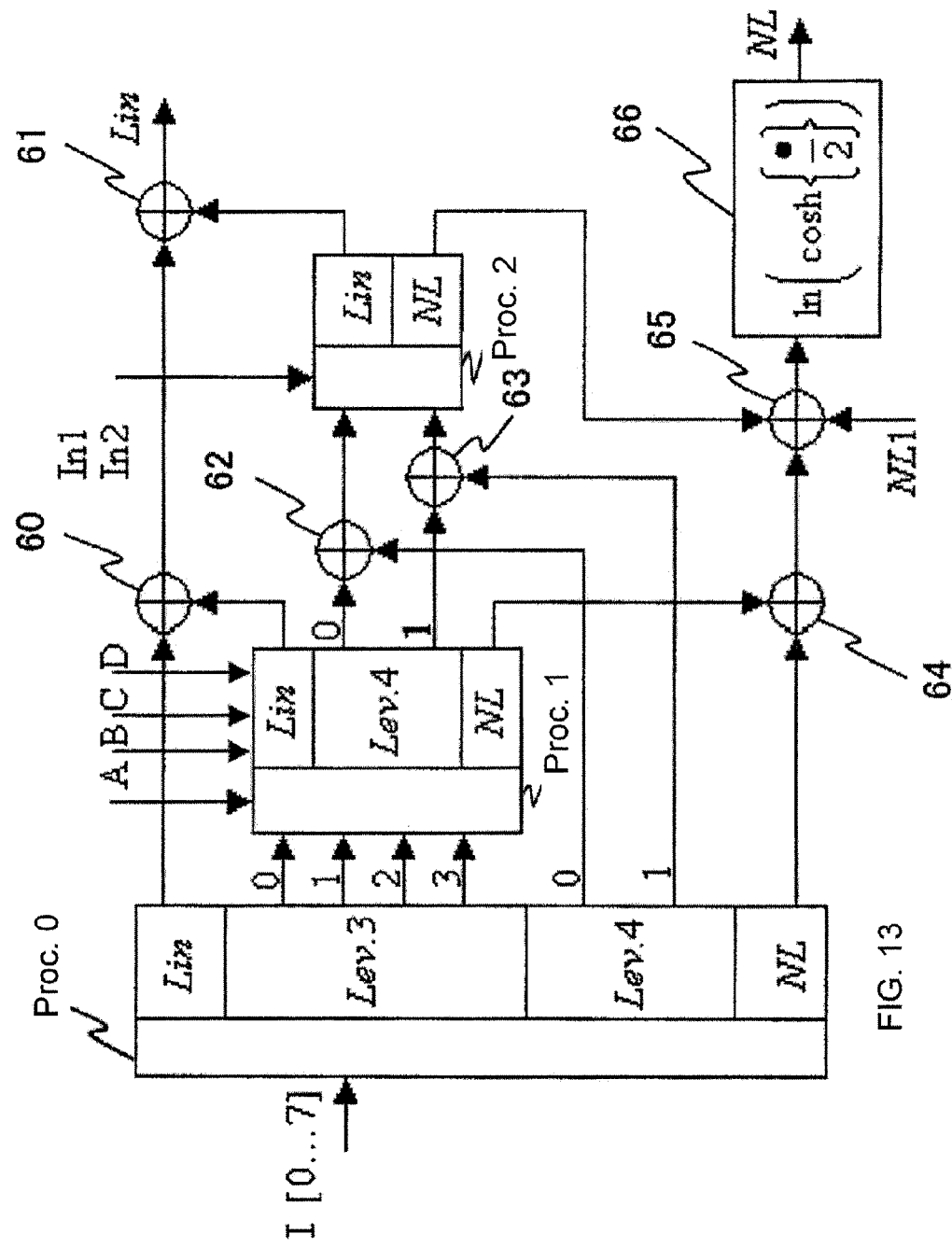
FIG. 13 is the Main Processor implemented in the single bit receiver (FIG. 6)
Figure 15:
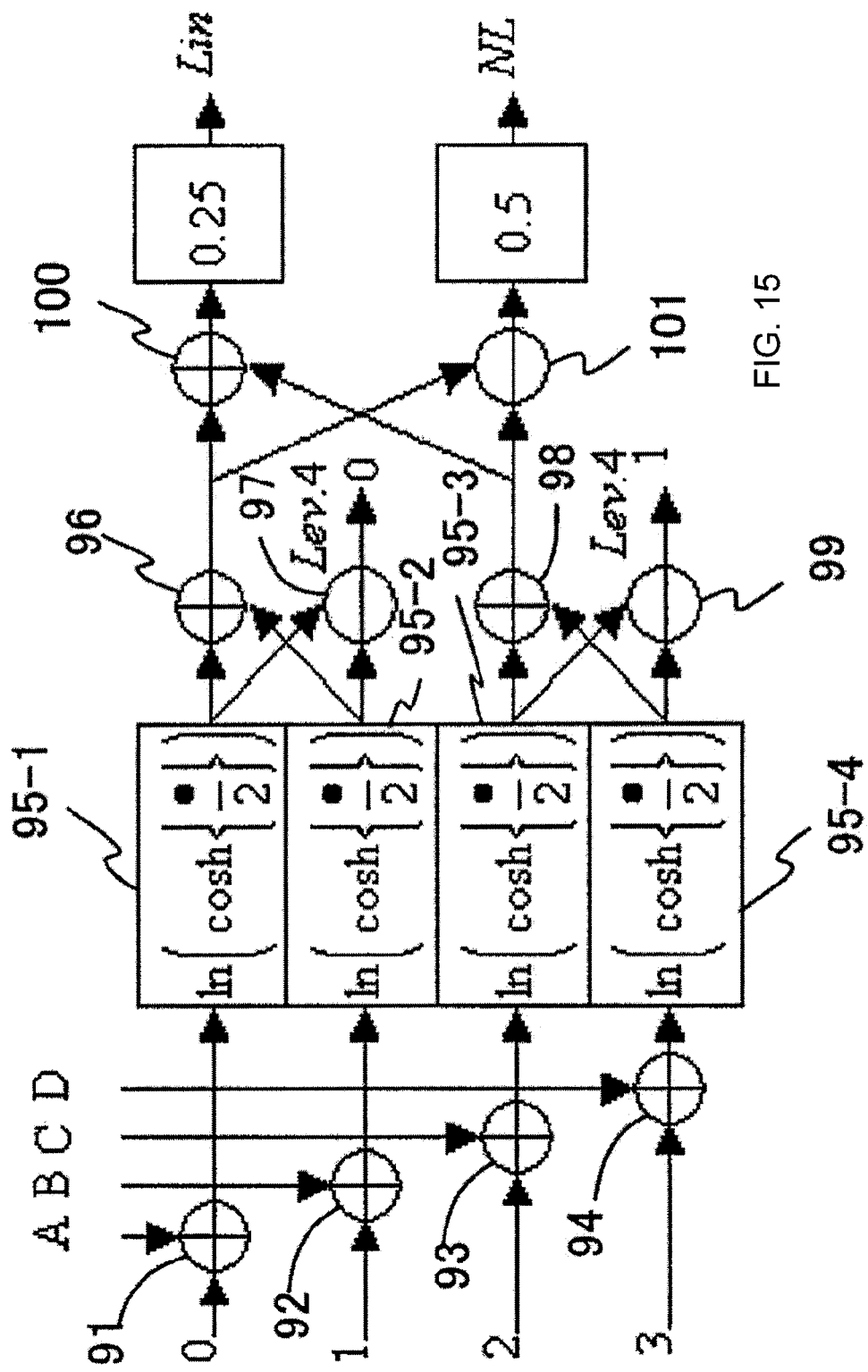
FIG. 15 is Processor 1, implemented by the Main Processor (FIG. 13)
Figure 16:
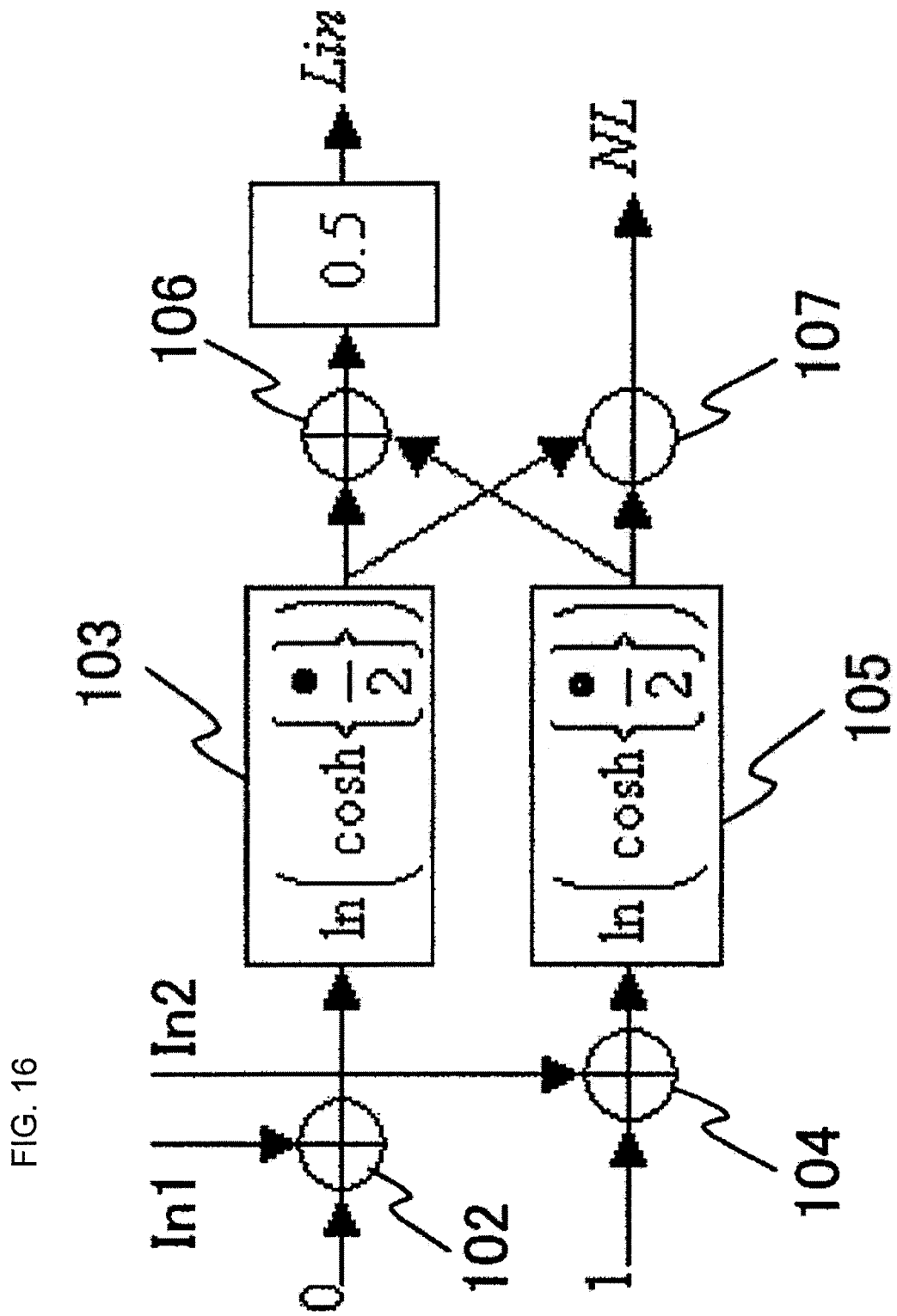
FIG. 16 is Processor 2, implemented by the Main Processor (FIG. 13)

| Expression | Figure |
|---|---|
| $S=-2S_0$, | FIG. 6 |
| $NL1=+S_0-A_1+\Delta \ln P(i_{02})$ for arm $A$, | FIG. 13 |
| $NL1=-S_0-A_1+\Delta \ln P(i_{02})$ for arm $B$, | FIG. 13 |
| $A=-(S_3+A_1)+\Delta \ln P(q_{01})$, | FIG. 15 |
| $B=-(S_3-A_1)+\Delta \ln P(q_{01})$, | FIG. 15 |
| $C=-(S_3+A_1)+\Delta \ln P(q_{01})$, | FIG. 15 |
| $D=+(S_3-A_1)+\Delta \ln P(q_{01})$, | FIG. 15 |
| $In1=-2S_3+\Delta \ln P(q_{01})$, | FIG. 16 |
| $In2=-2S_3+\Delta \ln P(q_{01})$, | FIG. 16 |

Bit $q_{01}$:
LUT A, LUT B shown in FIG. 10

| Expression | Figure |
|---|---|
| $S=-2S_3$, | FIG. 6 |
| $NL1=+S_0-A_1+\Delta \ln P(i_{02})$ for arm $A$, | FIG. 13 |
| $NL1=-S_0-A_1+\Delta \ln P(i_{02})$ for arm $B$, | FIG. 13 |
| $A=-(S_3+A_1)+\Delta \ln P(q_{01})$, | FIG. 15 |
| $B=+(S_3-A_1)+\Delta \ln P(q_{01})$, | FIG. 15 |
| $C=-(S_3+A_1)+\Delta \ln P(q_{01})$, | FIG. 15 |
| $D=+(S_3-A_1)+\Delta \ln P(q_{01})$, | FIG. 15 |
| $In1=-(S_0+A_1)+\Delta \ln P(i_{02})$, | FIG. 16 |
| $In2=+(S_0-A_1)+\Delta \ln P(i_{02})$, | FIG. 16 |

Bit $i_{02}$:
LUT A, LUT B shown in FIG. 11

| Expression | Figure |
|---|---|
| $S=-A_1$, | FIG. 6 |
| $NL1=-3S_0+\Delta \ln P(i_{01})$ for arm $A$, | FIG. 13 |
| $NL1=-S_0+\Delta \ln P(i_{01})$ for arm $B$, | FIG. 13 |
| $A=-(S_3+A_1)+\Delta \ln P(q_{02})$, | FIG. 15 |
| $B=+(S_3-A_1)+\Delta \ln P(q_{02})$, | FIG. 15 |
| $C=-(S_3+A_1)+\Delta \ln P(q_{02})$, | FIG. 15 |
| $D=+(S_3-A_1)+\Delta \ln P(q_{02})$, | FIG. 15 |
| $In1=-2S_3+\Delta \ln P(q_{01})$, | FIG. 16 |
| $In2=-2S_3+\Delta \ln P(q_{01})$, | FIG. 16 |

Bit $q_{02}$:
LUT A, LUT B shown in FIG. 12

$S = -A_1$, FIG. 6

$NL1 = -2S_0 + \Delta \ln P(i_{01})$ for arm $A$, FIG. 13

$NL1 = -2S_0 + \Delta \ln P(i_{01})$ for arm $B$, FIG. 13

$A = -3S_3 + \Delta \ln P(q_{01})$, FIG. 15, arm $A$ $B = -3S_3 + \Delta \ln P(q_{01})$, FIG. 15, arm $A$ $C = -3S_3 + \Delta \ln P(q_{01})$, FIG. 15, arm $A$ $D = -3S_3 + \Delta \ln P(q_{01})$, FIG. 15, arm $A$ $A = -S_3 + \Delta \ln P(q_{01})$, FIG. 15, arm B $B = -S_3 + \Delta \ln P(q_{01})$, FIG. 15, arm $B$ $C = -S_3 + \Delta \ln P(q_{01})$, FIG. 15, arm $B$ $D = -S_3 + \Delta \ln P(q_{01})$, FIG. 15, arm $B$ $In1 = -(S_0 + A_1) + \Delta \ln P(i_{02})$, FIG. 16

$In2 = +(S_0 - A_1) + \Delta \ln P(i_{02})$, FIG. 16

FIGS. 6 through 16 are explained below.

Figure 7:
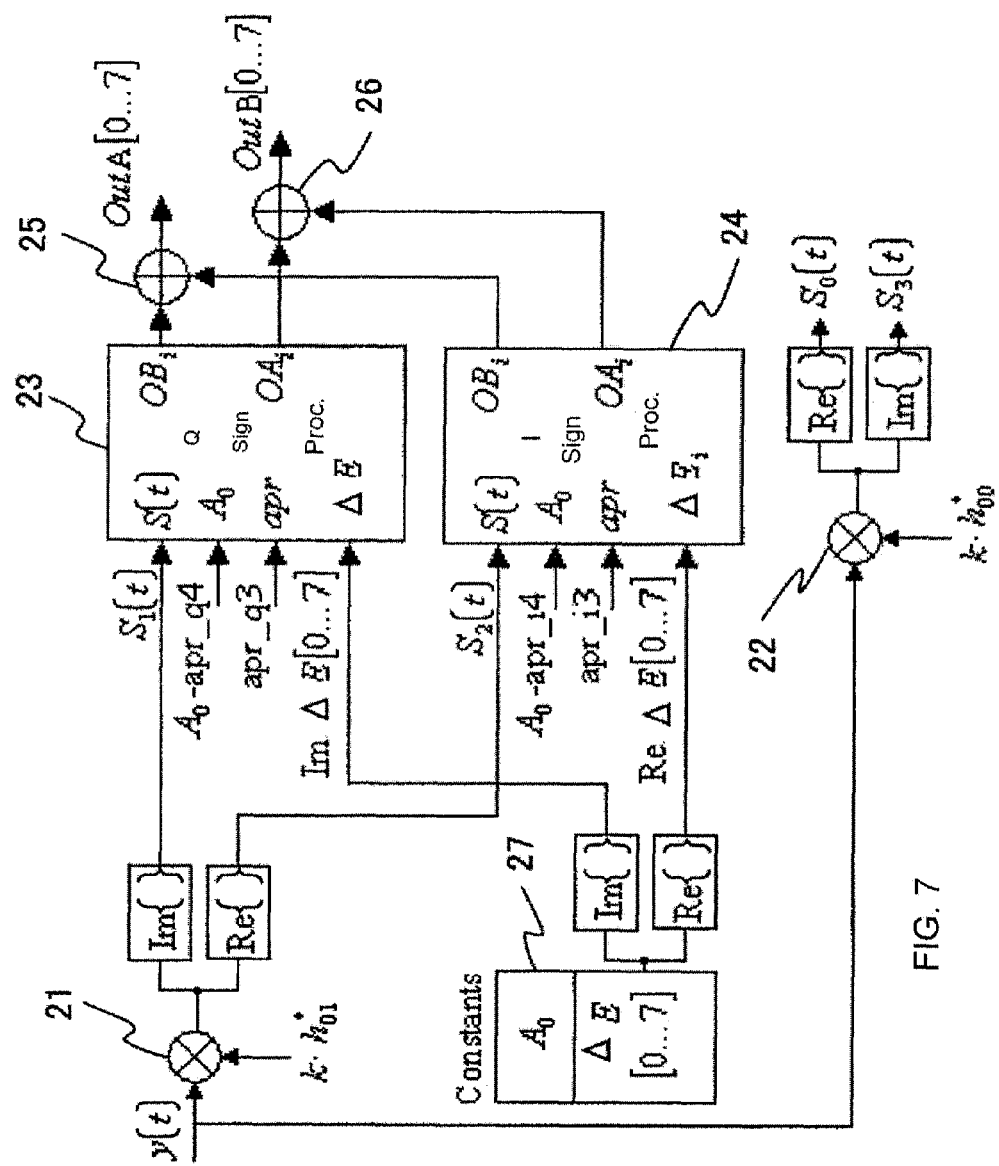
FIG. 7 is a Signal Processor that calculates set of signals "Out A [0 . . . 7]" and "Out B [0 . . . 7]" from the receiver's input signal y(t)

In FIG. 6, the input signal y(t) is input to the signal processor 20. The details of the signal processor 20 is shown in FIG. 7. The signal processor 20 outputs signals S, Out A, and Out B. The signal Out A is input to a lookup table LUT A, output after certain permutation and input to the main processor A. The signal Out B is input to a lookup table LUT B, output after certain permutation and input to the main processor B. The signal S is directly input to an adder 17. The details of the lookup tables LUT A and LUT B are shown in FIGS. 9 through 12. The details of the main processor A and B are shown in FIG. 13. The details of the main processor A are the same as the details of the main processor B.

The main processor A outputs signals Lin A and NL A. The main processor B outputs signals Lin B and NL B. The signals Lin A and NL B are input to a subtractor 16. The subtractor 16 outputs the difference of signals Lin A and NL B which is input to the adder 17. The signals NL A and Lin B are input to a subtractor 15. The subtractor 15 outputs the difference of signals NL A and Lin B which is input to the adder 17. The signals from the subtractor 15 and 16 and the signal S are added by the adder 17 and output as $\Delta \ln P(i, q/y(t))$.

Figure 8:
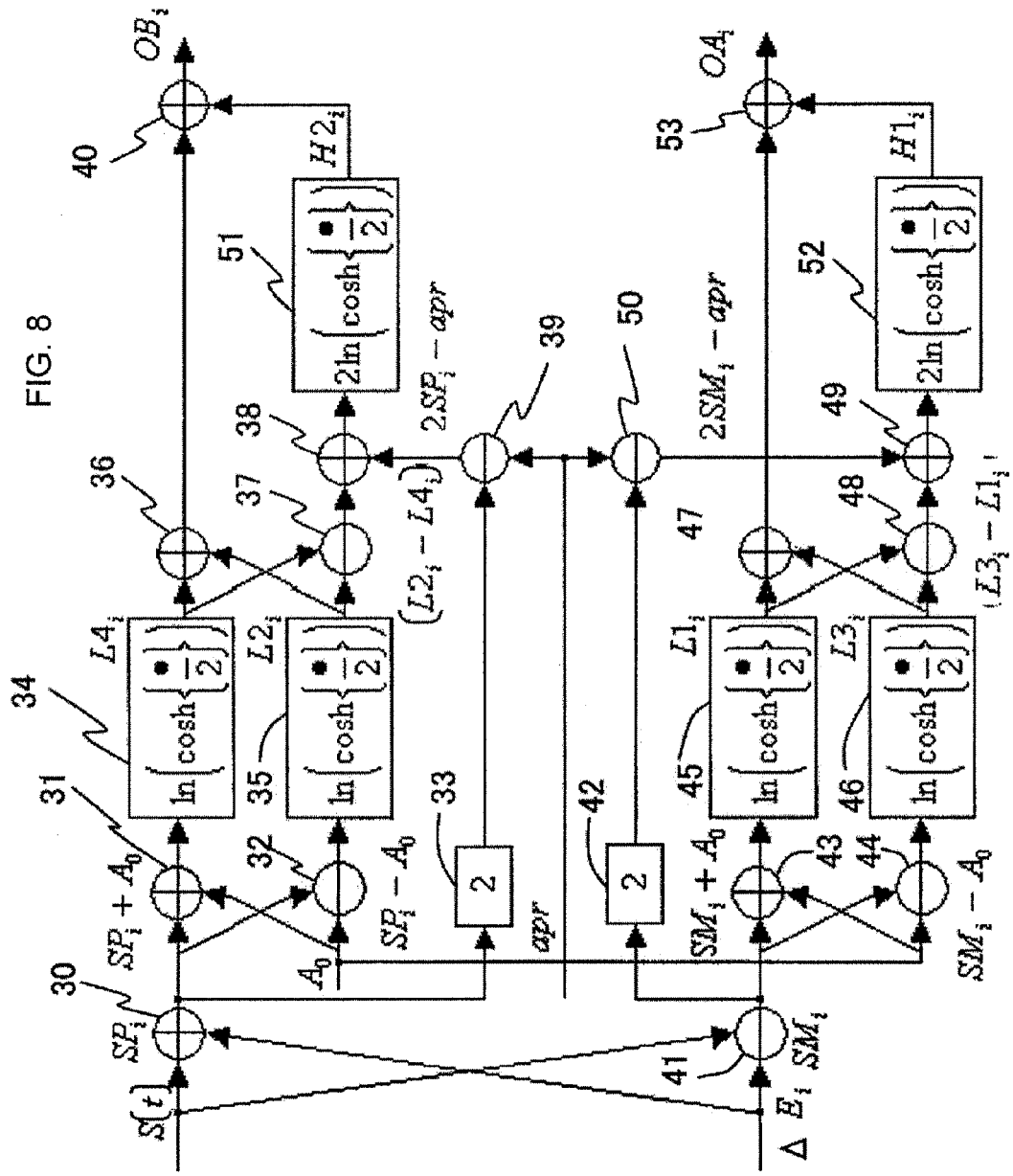
FIG. 8 is I and Q signal processor implemented by Signal Processor (FIG. 7)

In FIG. 7, the details of the signal processor 20 are shown. The input signal y(t) is input to a multiplier 22 and multiplied by $kh^*_{00}$. The real part of the output of the multiplier 22 is output as signal $S_0(t)$ and the imaginary part of the output of the multiplier 22 is output as signal $S_3(t)$. The input signal y(t) is also input to a multiplier 21 and multiplied by $kh^*_{01}$. The output of the multiplier 21 is divided into the real part which is signal $S_2(t)$ and the imaginary part which is signal $S_1(t)$. The signal $S_1(t)$ is input to an S(t) port of the Q signal processor 23 and the signal $S_2(t)$ is input to an S(t) port of the I signal processor 24. The details of the I signal processor 24 and those of the Q signal processor 23 is the same and the details are shown in FIG. 8. The I signal processor 24 receives signal $A_0$-apr_i4 at port $A_0$, apr_i3 at port apr and the real part of $\Delta E$ at port $\Delta E_i$, and calculates these signal values outputting signals $OB_i$ and $OA_i$. Similarly, the Q signal processor 23 receives signal $A_0$-apr_q4 at port $A_0$, apr_q3 at port apr and the imaginary part of $\Delta E$ at port $\Delta E_i$, and calculates these signal values outputting signals $OB_i$ and $OA_i$. The signals $OB_i$ from the I signal processor 24 and the Q signal processor 23 are input to an adder 25 and output as signal Out A after addition. The signals $OA_i$ from the I signal processor 24 and the Q signal processor 23 are input to an adder 26 and output as signal Out B after addition. The memory 27 stores constants $A_0$ and $\Delta E$.

FIG. 8 shows the details of the I and Q signal processors which are the same. The signal S(t), $\Delta E_i$, $A_0$ and apr are input. An adder 30 adds S(t) and $\Delta E_i$ outputting the sum as $SP_i$. An adder 31 calculates $SP_i + A_0$ which is input to a function calculator 34. A subtractor 32 calculates $SP_i - A_0$ which is input to a function calculator 35. The function calculator 34 calculates $\ln(\cosh((SP_i + A_0)/2))$ as $L4_i$. The function calculator 35 calculates $\ln(\cosh((SP_i - A_0)/2))$ as $L2_i$. An adder 36 calculates $L2_i + L4_i$ which is input to an adder 40. An multiplier 33 multiplies $SP_i$ by 2 and input the result to a subtractor 39. The signal apr is input to the subtractor 39 and the subtractor 39 calculates $2SP_i$-apr which is input to an adder 38. A subtractor 37 calculates $L2_i - L4_i$ which is input to the adder 38. The adder 38 calculates $L2_i - L4_i + 2SP_i$-apr which is input to a function calculator 51. The function calculator 51 calculates $2\ln(\cosh((L2_i - L4_i + 2SP_i - \text{apr})/2))$ as $H2_i$ which is input to an adder 40. The adder 40 calculates $L2_i + L4_i + H2_i$ outputting as $OB_i$.

A subtractor 41 subtracts $\Delta E_i$ from S(t) outputting the difference as $SM_i$. An adder 43 calculates $SM_i + A_0$ which is input to a function calculator 45. A subtractor 44 calculates $SM_i - A_0$ which is input to a function calculator 46. The function calculator 45 calculates $\ln(\cosh((SM_i + A_0)/2))$ as $L1_i$. The function calculator 46 calculates $\ln(\cosh((SM_i - A_0)/2))$ as $L3_i$. An adder 47 calculates $L1_i + L3_i$ which is input to an adder 53. A multiplier 42 multiplies $SM_i$ by 2 and input the result to a subtractor 50. The signal apr is input to the subtractor 50 and the subtractor 50 calculates $2SM_i$-apr which is input to an adder 49. A subtractor 48 calculates $L3_i - L1_i$ which is input to the adder 49. The adder 49 calculates $L3_i - L1_i + 2SM_i$-apr which is input to a function calculator 52. The function calculator 52 calculates $2\ln(\cosh((L3_i - L1_i + 2SM_i - \text{apr})/2))$ as $H1_i$ which is input to an adder 53. The adder 53 calculates $L1_i + L3_i + H1_i$ outputting as $OA_i$.

FIGS. 9 through 12 show lookup tables.

Figure 9:
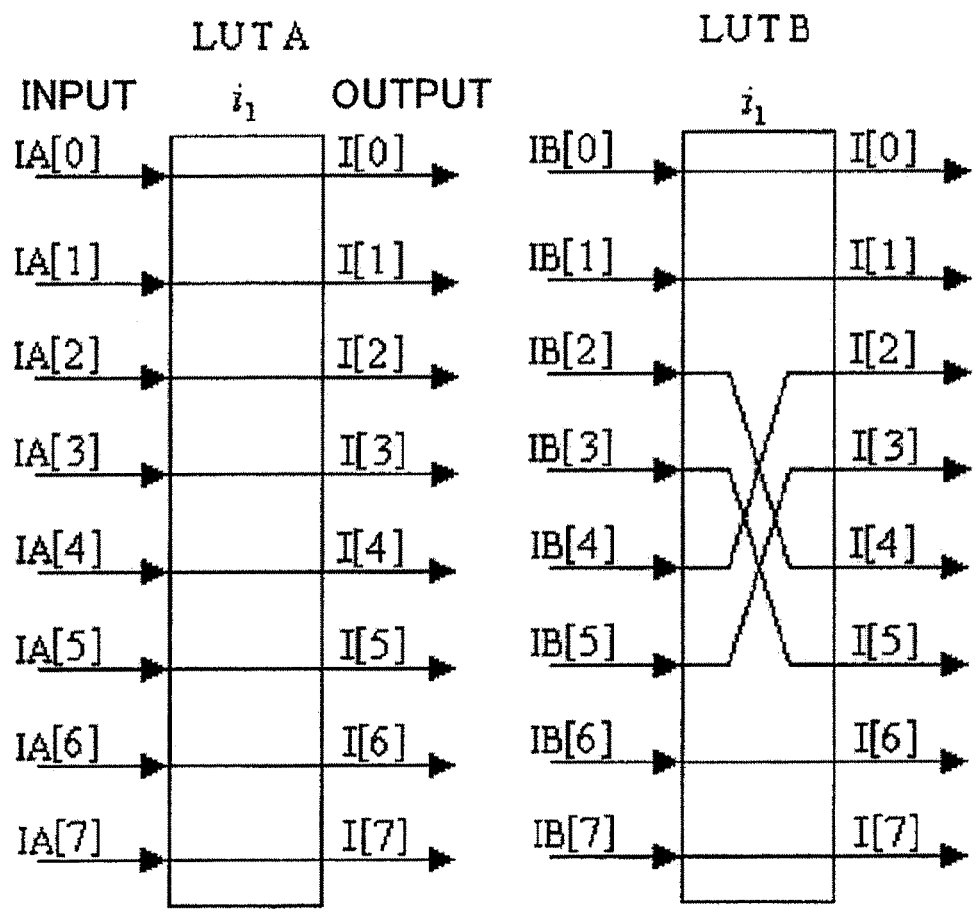
FIG. 9 is Look-Up Table (LUT) for bit $i_{o1}$.

In FIG. 9, the lookup tables LUT A and LUT B for bit $i_{01}$ are shown. The lookup table LUT A outputs input signals without permutation. The lookup table LUT B outputs input signals with permutation. By the lookup table LUT B, signal IB[2] is changed to signal I[4], signal IB[3] is changed to signal I[5], signal IB[4] is changed to signal I[2] and signal IB[5] is changed to signal I[3]. The other signals are output without permutation.

Figure 10:
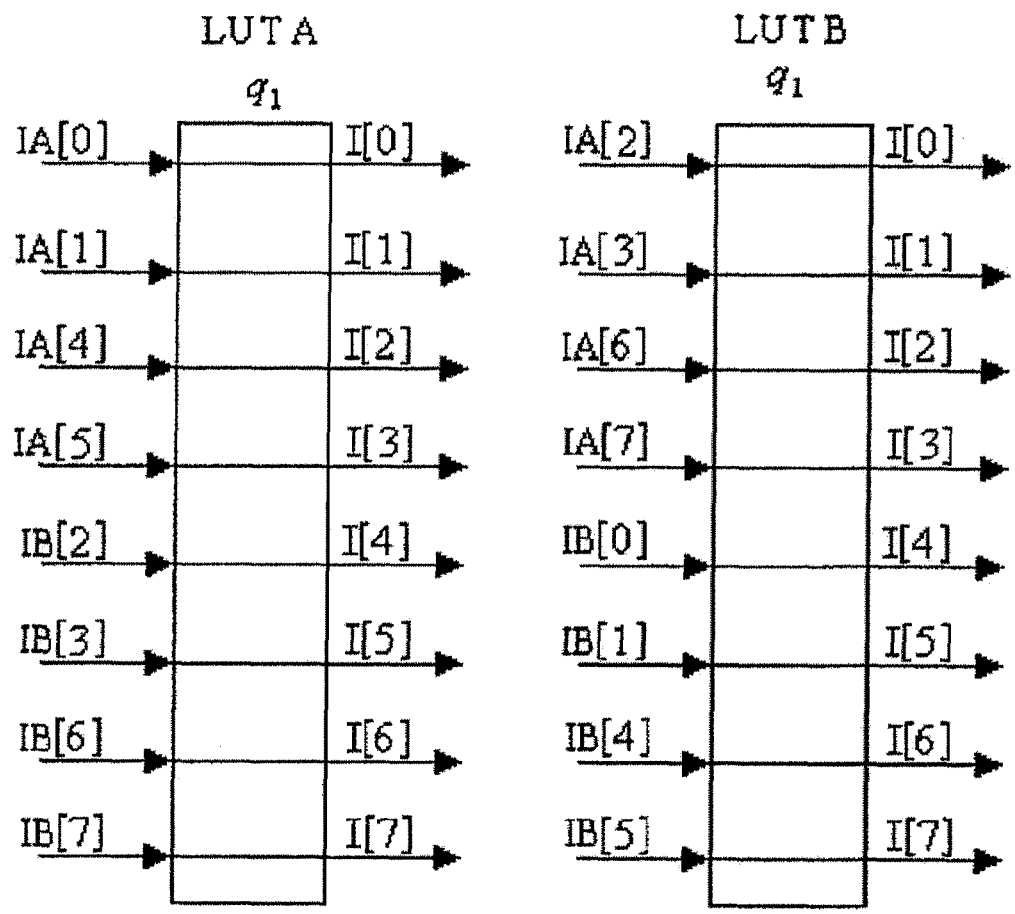
FIG. 10 is Look-Up Table (LUT) for bit $q_{o1}$.

In FIG. 10, the lookup tables LUT A and LUT B for bit $q_{01}$ are shown. The lookup table LUT A outputs input signals without permutation. The lookup table LUT B outputs input signals without permutation.

Figure 11:
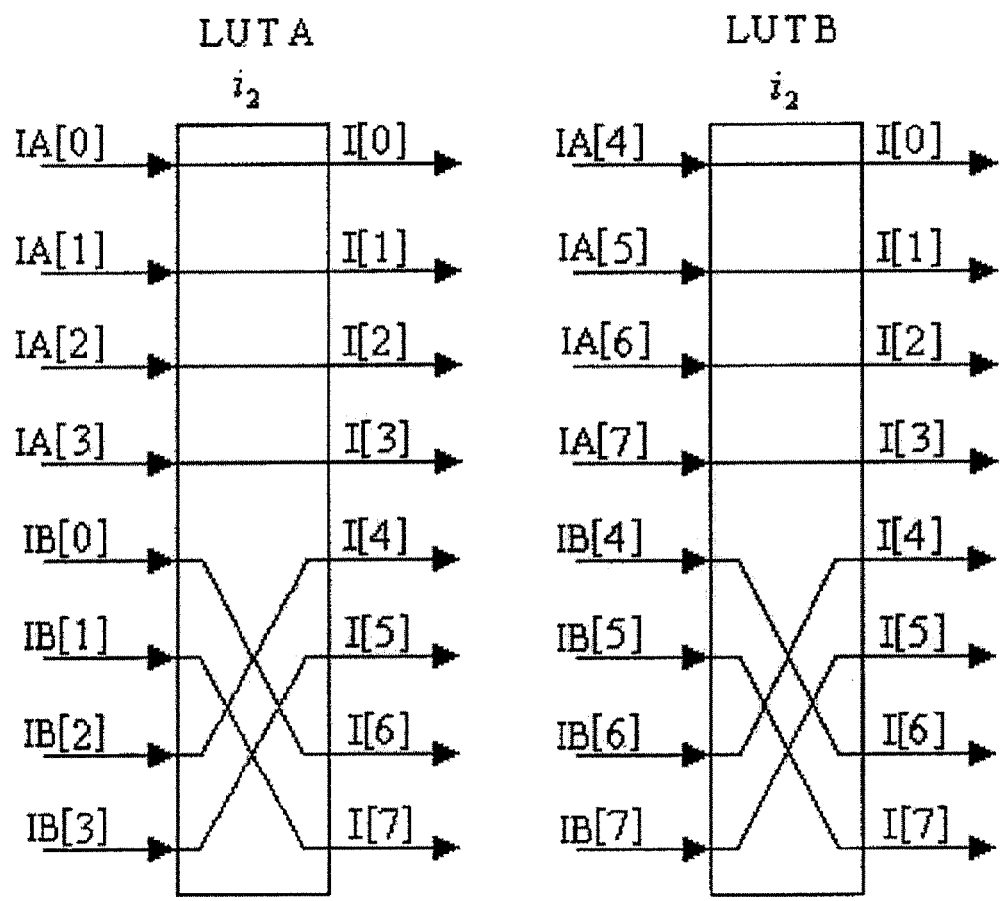
FIG. 11 is Look-Up Table (LUT) for bit $i_{o2}$.

In FIG. 11, the lookup tables LUT A and LUT B for bit $i_{02}$ are shown. By the lookup table LUT A, signal IB[0] is changed to signal I[6], signal IB[1] is changed to signal I[7], signal IB[2] is changed to signal I[4] and signal IB[3] is changed to signal I[5]. The other signals are output without permutation. By the lookup table LUT B, signal IB[4] is changed to signal I[6], signal IB[5] is changed to signal I[7], signal IB[6] is changed to signal I[4] and signal IB[7] is changed to signal I[5]. The other signals are output without permutation.

Figure 12:
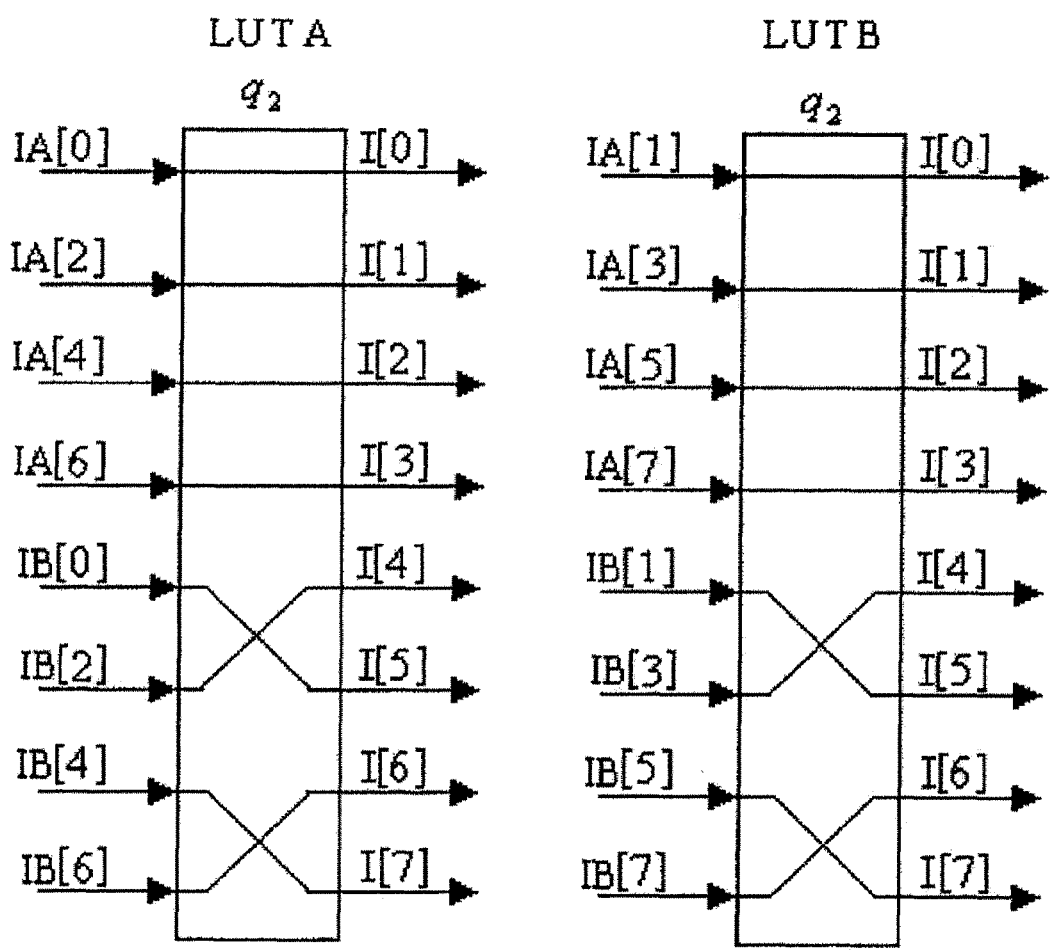
FIG. 12 is Look-Up Table (LUT) for bit $q_{o2}$.

In FIG. 12, the lookup tables LUT A and LUT B for bit $q_{02}$ are shown. By the lookup table LUT A, signal IB[0] is changed to signal I[5], signal IB[2] is changed to signal I[4], signal IB[4] is changed to signal I[7] and signal IB[6] is changed to signal I[6]. The other signals are output without permutation. By the lookup table LUT B, signal IB[1] is changed to signal I[5], signal IB[3] is changed to signal I[4], signal IB[5] is changed to signal I[7] and signal IB[7] is changed to signal I[6]. The other signals are output without permutation.

FIG. 13 shows the details of the main processor common to both the main processor A and the main processor B. Input signals I[0], . . . , I[7] are input to the main processor. I [0], . . . , I[7] input to processor 0 are processed and output as signal Lin, Lev. 3, Lev. 4, and NL. The signal Lin is input to an adder 60. The signal Lev. 3 is input to a processor 1. Signal 0 and signal 1 of signal Lev. 4 are input to an adder 62 and an adder 63, respectively. A signal NL is input to an adder 64. Four signals of Lev. 3 from the processor 0 and constants A, B, C, D are processed by the processor 1 and output as signals Lin, Lev. 4, and NL. The signal Lin is input to the adder 60. The added signal by the adder 60 is input to an adder 61. Signal 0 and 1 of Lev. 4 from the processor 1 are input to the adder 62 and 63, respectively. The adder 62 adds the signal 0 of Lev. 4 from the processor 0 and the signal 0 of Lev. 4 from the processor 1 outputting the result to a processor 2. The adder 63 adds the signal 1 of Lev. 4 from the processor 0 and the signal 1 of Lev. 4 from the processor 1 outputting the result to the processor 2. The signal NL from the processor 1 is input to the adder 64, summed with the signal NL from the processor 0 and output to an adder 65. The processor 2 receives the outputs of the adder 62 and 63 and constants In1 and In2 outputting signals Lin and NL. The signal Lin from the processor 2 and the output of the adder 60 are summed by an adder 61 outputting the signal Lin of the main processor. The output of the adder 64, the signal NL from the processor 2 and a constant NL1 are added by the adder 65 and the result is input to a function calculator 66. The function calculator 66 calculates ln(cosh((input to the 66)/2)) outputting as NL of the main processor.

Figure 14:
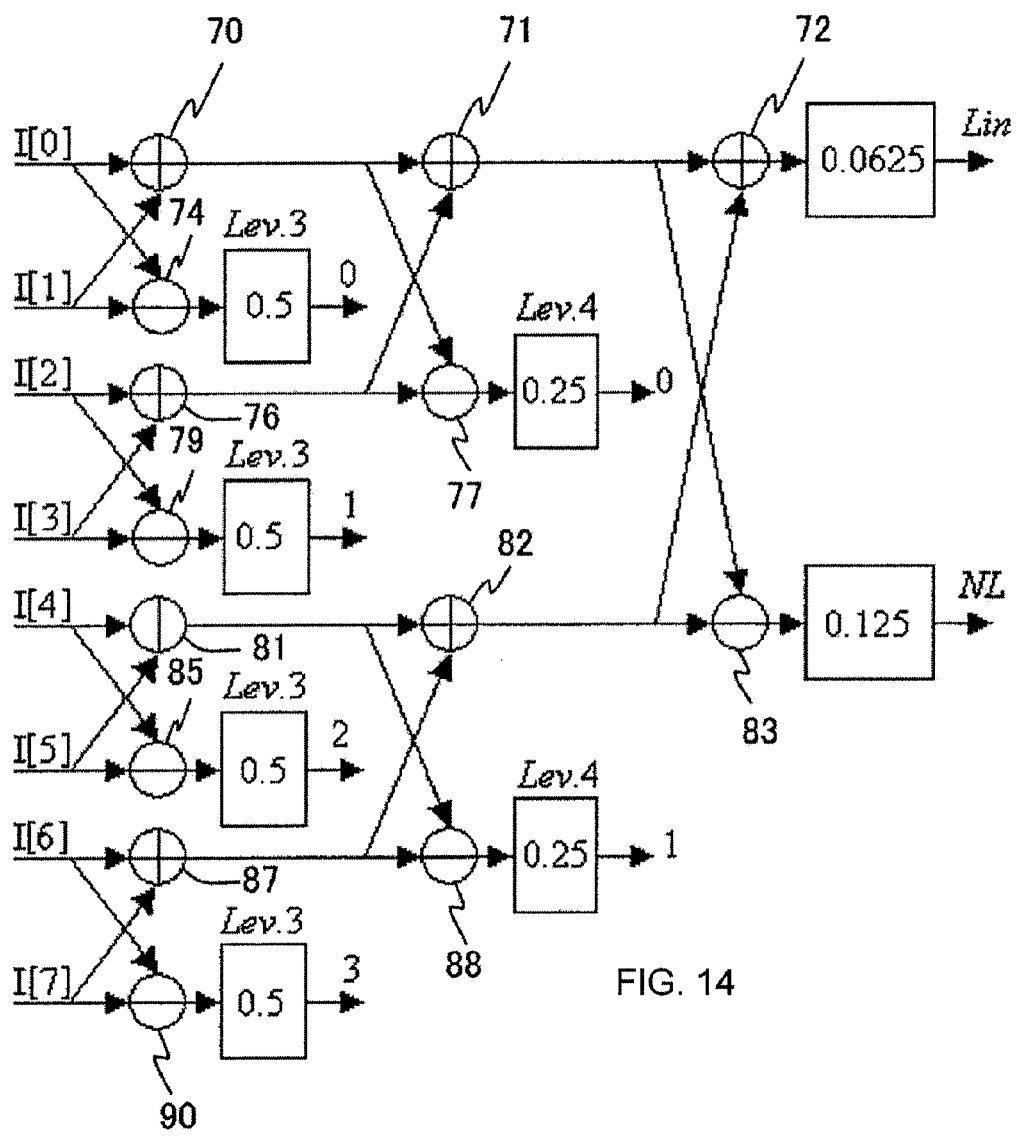
FIG. 14 is Processor 0, implemented by the Main Processor (FIG. 13)

FIG. 14 shows the details of the processor 0 of FIG. 13. Input signal I[0] is summed with I[1] by an adder 70 which is input to an adder 71. I[1] is subtracted from I[0] by a subtractor 74 and the result multiplied by 0.5 is output as signal 0 of Lev. 3. I[2] is summed with I[3] by an adder 76. The output of the adder 76 is input to the adder 71 and a subtractor 77. The output of the subtractor 77 multiplied by 0.25 is output as signal 0 of Lev. 4. The output of the adder 71 is input to an adder 72. I[3] is subtracted from I[2] by a subtractor 79 and the result multiplied by 0.5 is output as signal 1 of Lev. 3. I[4] is summed with I[5] by an adder 81 and input-to an adder 82. I[5] is subtracted from I[4] by a subtractor 85 and the result multiplied by 0.5 is output as signal 2 of Lev. 3. I[6] is summed with I[7] by an adder 87 and the result is input to the adder 82 and a subtractor 88. The output of the subtractor 88 multiplied by 0.25 is output as signal 1 of Lev. 4. The adder 82 adds the-output of the adder 81 with the output of the adder 87 inputting the result to a subtractor 83. The subtractor 83 subtracts the output of the adder 82 from the output of the subtractor 71 and the output of the subtractor 83 multiplied by 0.125 is output as signal NL. I[7] is subtracted from I[6] by a subtractor 90 and the output of the subtractor 90 multiplied by 0.5 is output as signal 3 of Lev. 3.

FIG. 15 shows the details of the processor 1 in FIG. 13. Signals 0 through 3 of Lev. 3 from the processor 0 are added with constants A through D, respectively. The output of the adder 91 is processed by the function calculator 95-1 using function ln(cosh (input/2)). Similarly, the output of the adder 92 is processed by the function calculator 95-2, the output of the adder 93 is processed by the function calculator 95-3, and the output of the adder 94 is processed by the function calculator 95-4. The output of the function calculator 95-1 and the output of the function calculator 95-2 are added by an adder 96 and the result is input to an adder 100. The output of the function calculator 95-2 is subtracted from the output of the function calculator 95-1 outputting the result as signal 0 of Lev. 4. The output of the function calculator 95-3 and the output of the function calculator 95-4 are added by an adder 98 and the result is input to an adder 101. The output of the function calculator 95-4 is subtracted from the output of the function calculator 95-3 outputting the result as signal 1 of Lev. 4. The output of the adder 96 and the output of the adder 98 are added by the adder 100 and the result multiplied by 0.25 is output as signal Lin. The output of adder 98 is subtracted from the output of the adder 96 by the subtractor 101 and the result multiplied by 0.5 is output as signal NL.

Signal 0 of input is added with signal In1 by the adder 102 inputting the result to a function calculator 103. Signal 1 of input is added with signal In2 by the adder 104 inputting the result to a function calculator 105. The function calculators 103 and 105 process the input with a function ln(cosh(input/ 2)). The outputs of the function calculator 103 and 105 are added by an adder 106. The output of the adder 106 multiplied by 0.5 is output as signal Lin. The output of the function calculator 105 is subtracted from the output of the function calculator 103 by a subtractor 107 outputting signal NL.

Bit $i_{01}$ in the Receiver REC 1

According to the present invention, the bit estimations are obtained in both REC0 and REC1 receivers independently as shown in FIGS. 1 and 3.

$$P(i_{01} = +1) = \sum_{n=0}^{127} P_a(S_n) \cdot P(S_n / y_1(t)) \quad (27)$$

For all $S_n \in D_0 = \{i_1 = +1, x, x, x\}$ $$P(i_{01} = -1) = \sum_{n=0}^{127} P_a(S_n) \cdot P(S_n / y_1(t)) \quad (28)$$

For all $S_n \in D_0 = \{i_1 = -1, x, x, x\}$

Thus in the case of REC1 the same block-diagram that shown in FIGS. 6-16 can be used for calculation of $\Delta \ln P(i_{01}/y_1(t))$ from the input signal $y_1(t)$. However the following replacements in FIG. 6 are necessary:

$S_0 = Re\{k \cdot y_0 \cdot h^*_{10}\}$, $S_1 = Im\{k \cdot y_0 \cdot h^*_{11}\}$ $S_2 = Re\{k \cdot y_0 \cdot h^*_{11}\}$, $S_3 = Im\{k \cdot y_0 \cdot h^*_{10}\}$ $\Delta E_{i\ 32\ k \cdot h10} h^*_{11} \cdot S^*_i$ $Re \Delta E_i = Re(\Delta E_i) = Re(k \cdot h_{10} \cdot h^*_{11} \cdot S^*_i)$, $Im \Delta E_i = Im(\Delta E_i) = Im(k \cdot h_{10} \cdot h^*_{11} \cdot S^*_i)$, when $S^*_i$ are still defined in Table 1.

$A_0 = 8|h_{11}|^2$, $A_1 = 8|h_{10}|^2$

A priori apr_q3=$\Delta \ln P(q_{11}/y_1(t))$ is obtained from REC1 i.e. obtained from the adjacent receiver.

A priori apr_q4=$\Delta \ln P(q_{12}/y_1(t))$ is obtained from REC1 i.e. obtained from the adjacent receiver.

A priori apr_i3=$\Delta \ln P(i_{11}/y_1(t))$ is obtained from REC1 i.e. obtained from the adjacent receiver.

A priori apr_i4=$\Delta \ln P(i_{12}/y_1(t))$ is obtained from REC1 i.e. obtained from the adjacent receiver.

Combining

Finally, estimations for bits that are obtained in both receivers, $\Delta \ln P(D_0/y_0(t))$ and $\Delta \ln P(D_0/y_1(t))$ are combined with combiner scheme shown in FIG. 4 with the following slicer where decisions about transmitted bits $i_{01}$, $i_{02}$, $q_{01}$, $q_{02}$ are made. The decision about transmitted bits is made by slicer.

Processing Symbol $D_1$

As can be found from FIG. 1, the proposed MIMO 2 by 2 transmission scheme is symmetrical with respect to transmitted symbols $D_0$ and $D_1$. Therefore all discussions and equations that were obtained for symbol $D_0$ are correct for symbol $D_1$. The only substitution which must be done is: $h_{00} \rightarrow h_{10}$ and $h_{01} \rightarrow h_{11}$ Complexity Analysis In order to prove low complexity of the proposed algorithm we estimate complexity level for cases when both transmitters employ QAM-16 constellation shown in FIG. 5. We estimate complexity in the terms of operations—complex/real addition, subtraction and multiplication.

The MLD detector multiplies D by the known channel matrix and then calculates the Euclidean distance from the received vector. Thus, the complexity of the MLD detector is exponential in the number of transmitted antennas. Each of the Euclidean distance calculations requires four complex multiplications, two complex additions and two complex subtractions.

One complex multiplication is equal to four real multiplications plus two real additions and one real subtraction:

$$(a+i \cdot b) \cdot (c+i \cdot d) = a \cdot c + i \cdot a \cdot d + i \cdot b \cdot c - b \cdot d \quad (29)$$

Note that in the following complexity analysis we assumed that the complexity of the real additions and real subtractions are the same.

TABLE 3

QAM-16, MIMO 2 by 2 by complex operations

| | Complex Multiplication | Complex ADD | Complex SUB | Real Multiplication | Real ADD |
|---|---|---|---|---|---|
| MLD | 256 | 128 | 128 | | |
| MLD | In real term | In real term | In real term | 1024 | 768 |
| Turbo | 16 | 0 | 0 | | |
| Turbo | In real term | In real term | In real term | 64 | 46 |

5 256 complex multiplications=1024 real multiplication+512 real addition+256 real subtractions.

16 complex multiplications=64 real multiplications+22 real additions+16 real subtractions.

As can be found from Table 3 the turbo iterations of the present invention require less operation than MLD-based detector and at the same time provide the similar BER performances (FIG. 2).

What is claimed is:

1. A receiver for M-ary-QAM MIMO communication system comprising at least two receiving units each with at least one antenna, each receiving unit comprising:
    a posteriori probability calculation unit for calculating a posteriori probabilities for signals which are detected by at least one of the antenna and are modulated such that an amplitude of the signals is changed according to signal values, based on posteriori probabilities received from another receiving unit;
    a transmission unit for transmitting the calculated a posteriori probabilities to the other receiving unit; and
    a decision unit for deciding a signal value based on a combination of the calculated a posteriori probabilities and the received a posteriori probabilities from the other receiving unit, wherein the transmission of the a posteriori probabilities between the at least two receiving units is repeated a number of times.

2. The receiver according to claim 1, wherein the signals detected by the receiving unit are modulated by QAM-16 method.

3. The receiver according to claim 1, wherein the a posteriori probability is given by $$\Delta P(i/y(t)) = \frac{P(i=+1/y(t))}{P(i=-1/y(t))}$$

or $$\Delta \ln P(i/y(t)) = \ln P(i=+1/y(t)) - \ln P(i=-1/y(t))$$

where P(i=+1/y(t)) is a probability that bit i is +1 in the case of received signal being y(t) and P(i=−1/y(t)) is a probability that bit i is −1 in the case of received signal being y(t).

4. The receiver according to claim 1, wherein the a posteriori probability calculation unit comprises a non-linear unit for non-linearly changing a first value to a second value.

5. A receiving method of a receiver for M-ary-QAM MIMO Communication System comprising at least two receiving units, each receiving unit with at least one antenna, the method of each receiving unit comprising:
    calculating a posteriori probabilities for signals which are detected by at least one of the antenna and are modulated such that an amplitude of the signals is changed according to signal values, based on posteriori probabilities received from another receiving unit;
    transmitting the calculated a posteriori probabilities to the other receiving unit; and
    deciding a signal value based on a combination of the calculated a posteriori probabilities and the received a posteriori probabilities from the other receiving unit, wherein the transmission of the a posteriori probabilities between the at least two receiving units is repeated a number of times.

* * * * *